United States Patent
Matsuo et al.

(10) Patent No.: US 10,687,002 B2
(45) Date of Patent: *Jun. 16, 2020

(54) IMAGE-CAPTURING DEVICE AND DRIVE METHOD THEREFOR

(71) Applicant: Panasonic Intellectual Property Management Co., Ltd., Osaka (JP)

(72) Inventors: Junichi Matsuo, Osaka (JP); Sei Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,920

(22) Filed: Dec. 7, 2018

(65) Prior Publication Data

US 2019/0110006 A1    Apr. 11, 2019

Related U.S. Application Data

(63) Continuation of application No. 14/817,088, filed on Aug. 3, 2015, now Pat. No. 10,187,591, which is a
(Continued)

(30) Foreign Application Priority Data

Feb. 7, 2013    (JP) .................................. 2013-022125

(51) Int. Cl.
*H04N 5/33*    (2006.01)
*H04N 9/04*    (2006.01)
(Continued)

(52) U.S. Cl.
CPC ........... *H04N 5/332* (2013.01); *G01S 7/4863* (2013.01); *G01S 17/89* (2013.01); *H04N 5/33* (2013.01);
(Continued)

(58) Field of Classification Search
CPC .... H04N 5/332; H04N 9/04511; H04N 9/045; H04N 5/37213; H04N 5/33; H04N 5/376; G01S 7/4863; G01S 17/89
(Continued)

(56) References Cited

U.S. PATENT DOCUMENTS 5,055,667 A * 10/1991 Sayag ................ G01R 31/2641
                                                             250/208.1
6,380,539 B1    4/2002 Edgar
(Continued)

FOREIGN PATENT DOCUMENTS

JP    2008-8700 A    5/2008
JP    2009-236914 A    10/2009
JP    2010-35168 A    2/2010

OTHER PUBLICATIONS

Kim, W. et al.,"A 1.5Mpixel RGBZ CMOS Image Sensor for Simultaneous Color and Range Image Capture," ISSCC 2012/Session 22/Image Sensors/22.7; IEEE International Solid-State Circuits Conference, Feb. 2012; pp. 392-393.
(Continued)

*Primary Examiner* — Zaihan Jiang
(74) *Attorney, Agent, or Firm* — McDermott Will & Emery LLP

(57) ABSTRACT

An image-capturing device includes an infrared light source configured to emit infrared light, and a solid-state image-capturing device including a plurality of first pixels configured to convert visible light into signal charge and a plurality of second pixels configured to convert infrared light into signal charge, the plurality of first pixels and the plurality of second pixels being arranged on a semiconductor substrate in a matrix. The solid-state image-capturing device outputs, during the same single frame scanning period, a first signal obtained from the plurality of first pixels, a second signal obtained from the plurality of second pixels during a period
(Continued)

of time when the infrared light is emitted, and a third signal obtained from the plurality of second pixels during a period of time when the infrared light is not emitted.

3 Claims, 34 Drawing Sheets

Related U.S. Application Data continuation of application No. PCT/JP2013/007595, filed on Dec. 25, 2013.

(51) Int. Cl.
    *H04N 5/376*     (2011.01)
    *H04N 5/372*     (2011.01)
    *G01S 17/89*     (2020.01)
    *G01S 7/486*     (2020.01)
    *G01S 7/4863*     (2020.01)

(52) U.S. Cl.
    CPC ......... *H04N 5/376* (2013.01); *H04N 5/37213* (2013.01); *H04N 9/045* (2013.01); *H04N 9/04511* (2018.08)

(58) Field of Classification Search
    USPC .......................................................... 348/135
    See application file for complete search history.

(56) References Cited

U.S. PATENT DOCUMENTS

| | | | | |
|---|---|---|---|---|
| 8,659,698 B2 * | 2/2014 | Blayvas | ............. | G01B 11/2509 348/135 |
| 8,864,035 B2 * | 10/2014 | Fukuba | ................... | G02B 3/14 235/435 |
| 9,443,488 B2 | 9/2016 | Borenstein et al. | | |
| 9,635,282 B2 | 4/2017 | McManus et al. | | |
| 2006/0044429 A1 * | 3/2006 | Toda | ........................ | G01J 3/04 348/272 |
| 2006/0124833 A1 * | 6/2006 | Toda | ................. | H01L 27/14621 250/214 R |
| 2006/0268367 A1 | 11/2006 | Hayashide | | |
| 2007/0201738 A1 | 8/2007 | Toda | | |
| 2008/0122933 A1 | 5/2008 | Murayama | | |
| 2009/0050806 A1 * | 2/2009 | Schmidt | .............. | H04N 5/2254 250/332 |
| 2009/0244514 A1 | 10/2009 | Jin et al. | | |
| 2010/0020209 A1 | 1/2010 | Kim | | |
| 2010/0135397 A1 | 6/2010 | Tanaka | | |
| 2010/0225776 A1 * | 9/2010 | Taura | ................. | H01L 27/14609 348/222.1 |
| 2010/0295143 A1 * | 11/2010 | Yokogawa | ........ | H01L 27/14625 257/435 |
| 2010/0296703 A1 * | 11/2010 | Marti | ................. | G06K 9/00697 382/103 |
| 2012/0326256 A1 * | 12/2012 | Salsman | ........... | H01L 27/14603 257/432 |
| 2013/0194390 A1 * | 8/2013 | Hirooka | ............... | G01C 11/025 348/47 |
| 2013/0256509 A1 | 10/2013 | Yang et al. | | |
| 2013/0258112 A1 * | 10/2013 | Baksht | ...................... | H04N 5/04 348/164 |
| 2013/0265472 A1 | 10/2013 | Manabe et al. | | |
| 2014/0084137 A1 * | 3/2014 | de Groot | ........... | H01L 27/14625 250/208.1 |

OTHER PUBLICATIONS

International Search Report issued in corresponding International Patent PCT/JP2013/007595, dated Apr. 1, 2014; 5 pages with English translation.

\* cited by examiner

IMAGE-CAPTURING DEVICE AND DRIVE METHOD THEREFOR

CROSS-REFERENCE TO RELATED APPLICATIONS

This is a continuation of U.S. application Ser. No. 14/817,088 filed Aug. 3, 2015, which is a continuation of International Application No. PCT/JP2013/007595 filed on Dec. 25, 2013, which claims priority to Japanese Patent Application No. 2013-022125 filed on Feb. 7, 2013. The entire disclosures of these applications are incorporated by reference herein.

BACKGROUND

The present disclosure relates to image-capturing devices that capture an image (range image) of an object located at a certain distance, and more particularly, to an image-capturing device that captures a normal image (visible light image) along with a range image, and a method for driving the device.

A ranging camera (motion camera) that illuminates a space where shooting is performed with, for example, infrared light to detect a motion of the body or hand of an object (human subject), has in recent years been included in a television, game device, and the like. Such a ranging camera includes an image-capturing device known as a ranging sensor that obtains a range image for use in the ranging camera.

If the ranging sensor can obtain a normal visible light image as well as a range image simultaneously, this is effective in extracting a specific object from the image (background subtraction), producing a three-dimensional image, etc.

Japanese Unexamined Patent Publication No. 2008-8700 describes a single solid-state image-capturing device that simultaneously obtains a range image and a visible light image. Specifically, the solid-state image-capturing device includes a single sensor that can capture images using visible light and infrared (IR) light. The solid-state image-capturing device illuminates a space where shooting is performed with an IR pulse every other frame scanning period while capturing images using visible light and infrared light every frame scanning period. By producing a visible light image every frame scanning period and subtracting an IR pixel signal obtained by shooting in the absence of illumination with an IR pulse from an IR pixel signal obtained by shooting in the presence of illumination with an IR pulse, a range image from which an influence of background light has been removed is produced every other frame scanning period.

However, in the above solid-state image-capturing device, a plurality of frames are used to produce a range image from which an influence of background light has been removed, and therefore, if an object moves between two successive frames, an error occurs in a range image. Also, a plurality of frames are required to obtain each single range image as described above, the frame rate of range images is reduced. Therefore, there is a problem that distance information of a moving object cannot be accurately obtained.

SUMMARY

The present disclosure describes implementations of an image-capturing device that can obtain a visible light image, and a range image from which an influence of background light has been removed, during the same single frame scanning period, and a method for driving the device.

To achieve the object, an image-capturing device according to an embodiment of the present disclosure includes an infrared light source configured to emit infrared light, and a solid-state image-capturing device including a plurality of first pixels configured to convert visible light into signal charge and a plurality of second pixels configured to convert infrared light into signal charge, the plurality of first pixels and the plurality of second pixels being arranged on a semiconductor substrate in a matrix. The solid-state image-capturing device outputs, during the same single frame scanning period, a first signal obtained from the plurality of first pixels, a second signal obtained from the plurality of second pixels during a period of time when the infrared light is emitted, and a third signal obtained from the plurality of second pixels during a period of time when the infrared light is not emitted.

According to this embodiment, a signal for producing a visible light image and a signal for producing a range image from which an influence of background light has been removed can be obtained during the same single frame scanning period. Therefore, the accuracy of range information of a moving object and the frame rate can be improved.

Also, preferably, an infrared light component mixed in an output obtained from the first signal is removed by subtracting, from the output obtained from the first signal, a product obtained by multiplying outputs obtained from the second and third signals by a predetermined coefficient. As a result, the ability to reproduce the color of a visible light image can be improved.

According to the present disclosure, a signal for producing a visible light image and a signal for producing a range image from which an influence of background light has been removed can be obtained during the same single frame scanning period. Therefore, the ranging accuracy of a moving object and the frame rate can be improved.

DETAILED DESCRIPTION

Figure 1:
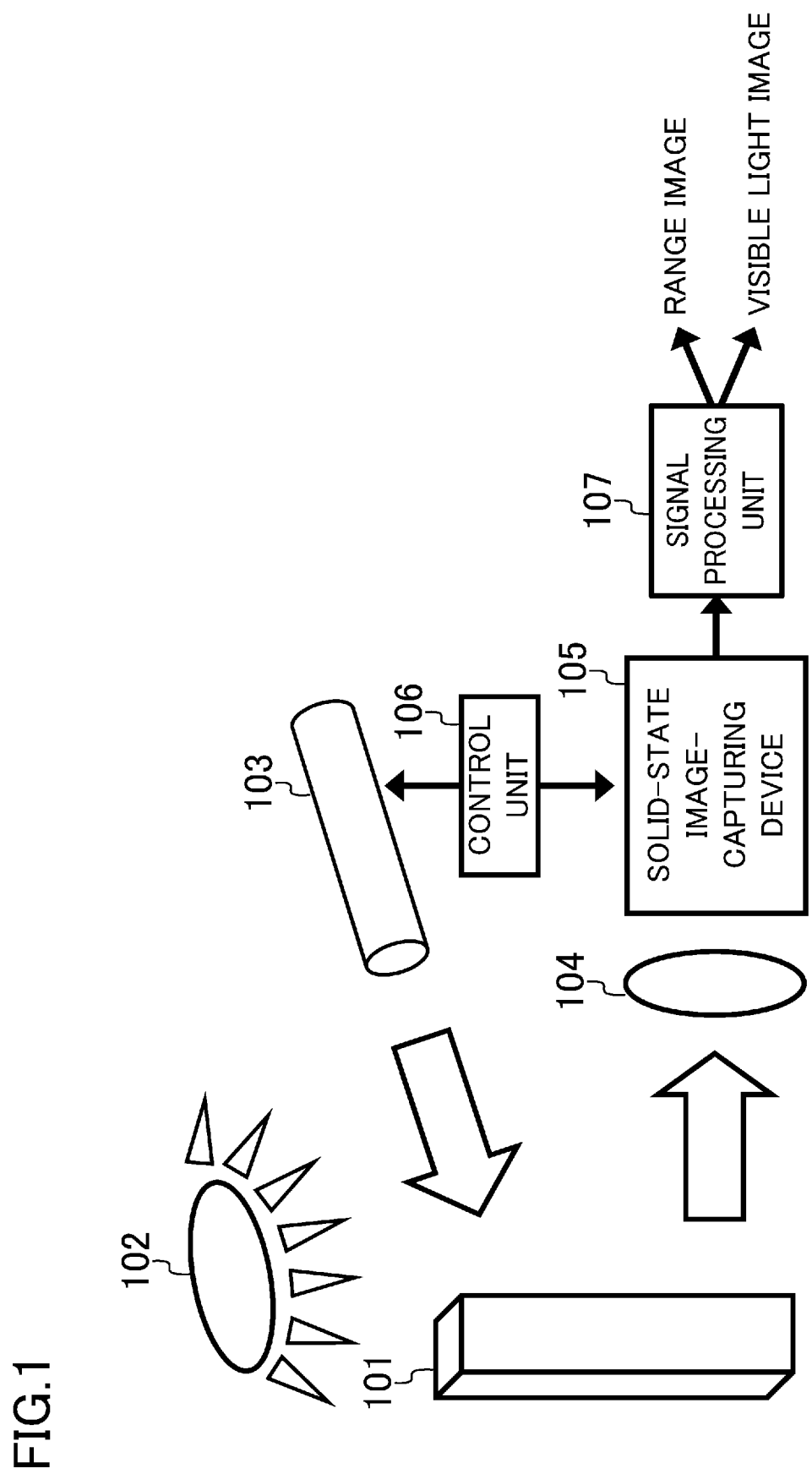
FIG. 1 is a block diagram showing an example configuration of a ranging system including an image-capturing device according to the present disclosure.

Embodiments of the present disclosure will now be described with reference to the accompanying drawings. The drawings and the following description are for illustrative purposes only and are in no way intended to limit the present disclosure. In the drawings, parts having substantially the same configuration, operation, and effect are indicated by the same reference characters.

FIG. 1 is a block diagram showing an example configuration of a ranging system including an image-capturing device according to the present disclosure. As shown in FIG. 1, an object 101 is provided in a space where shooting is performed. The space has illumination including visible light and infrared light emitted from a background light source 102. The image-capturing device includes an infrared light source 103, a lens 104, a solid-state image-capturing device 105, a control unit 106, and a signal processing unit 107. The image-capturing device is included in a ranging system employing one of various well-known infrared schemes, such as time-of-flight (TOF), structured light, stereo, etc.

The infrared light source 103 emits infrared laser light having a wavelength of, for example, 850 nm toward the object 101. The background light and the infrared laser light are reflected by the object 101 and then enter the lens 104, which then brings the light to a focus in the solid-state image-capturing device 105. The solid-state image-capturing device 105 includes a plurality of first pixels that convert visible light into signal charge and a plurality of second pixels that convert infrared light into signal charge. These pixels are arranged on a semiconductor substrate in a matrix. The control unit 106 controls the infrared light source 103 and the solid-state image-capturing device 105 so that the infrared light source 103 and the solid-state image-capturing device 105 are synchronized with each other. The signal processing unit 107 produces, from an output of the solid-state image-capturing device 105, a visible light image signal along with a range image signal based on the infrared laser light. Various specific examples of the solid-state image-capturing device 105 in FIG. 1 will now be described.

First Embodiment

Figure 2:
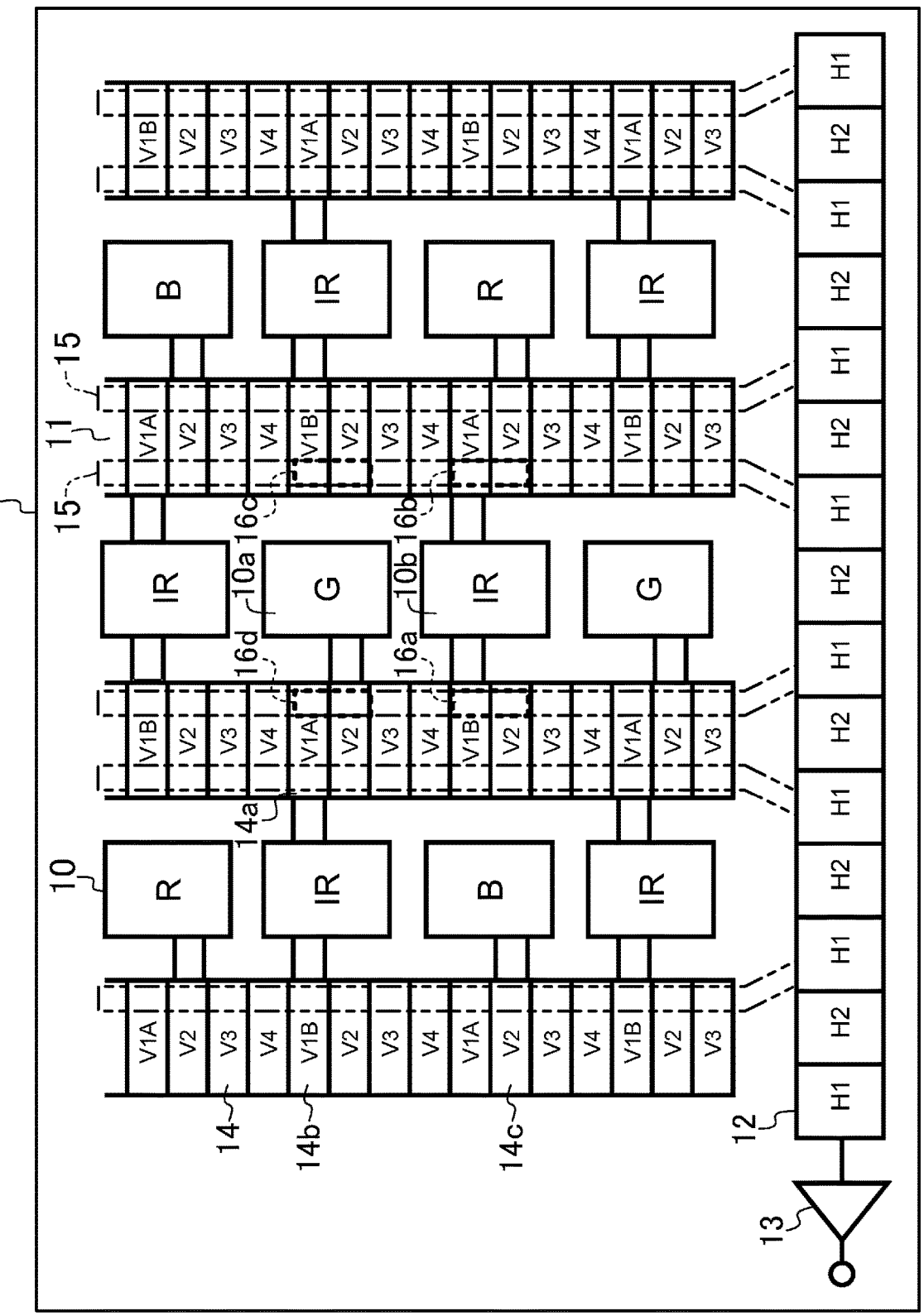
FIG. 2 is a plan view showing a first embodiment of the solid-state image-capturing device in FIG. 1.

FIG. 2 is a plan view showing a first embodiment of the solid-state image-capturing device 105 in FIG. 1. Here, it is assumed that the ranging system of FIG. 1 is of TOF, and the solid-state image-capturing device 105 is a charge-coupled-device (CCD) image sensor.

The solid-state image-capturing device of FIG. 2 includes a plurality of photoelectric conversion units 10 arranged on a semiconductor substrate in a matrix. The photoelectric conversion units 10 are divided into a plurality of photoelectric conversion units 10a that convert visible light into signal charge and a plurality of photoelectric conversion units 10b that convert infrared light into signal charge. Each of the visible light photoelectric conversion units 10a includes a filter that selectively transmits red (R), green (G), or blue (B) light. Each of the infrared light photoelectric conversion units 10b includes a filter that selectively transmits infrared (IR) light.

The solid-state image-capturing device of FIG. 2 further includes vertical transfer units 11 that transfer signal charge read from the photoelectric conversion units 10a and 10b in the column direction, a horizontal transfer unit 12 that transfers the signal charge transferred by the vertical transfer units 11 in the row direction (horizontal direction), a charge detection unit 13 that outputs the signal charge transferred by the horizontal transfer unit 12, first read electrodes (V1A) 14a and second read electrodes (V1B) 14b that are provided, corresponding to the respective infrared light photoelectric conversion units 10b, and output read signal charge to the vertical transfer units 11 on both sides at different timings, and third read electrodes (V2) 14c that are provided, corresponding to the respective visible light photoelectric conversion units 10a.

Here, the solid-state image-capturing device is an inter-line-transfer CCD that performs progressive scanning. For example, the vertical transfer unit 11 performs four-phase drive, where there are four vertical transfer electrodes (gates) 14 per pixel. The horizontal transfer unit 12 performs two-phase drive. The vertical transfer electrodes 14a, 14b, and 14c of the four-phase-drive vertical transfer unit 11 also function as electrodes that read signal charge from the photoelectric conversion units 10a and 10b. The vertical transfer unit 11, which includes two vertical transfer paths 15 that pass signal charge, reads out and transfers signal charge accumulated in the photoelectric conversion units 10a and 10b as separate packets represented by signal packets 16a, 16b, 16c, and 16d, for example.

Each pixel includes a vertical overflow drain (VOD). When a high voltage is applied to a VSUB electrode 17 connected to the substrate, signal charge of all pixels is simultaneously drained to the substrate.

Figure 3:
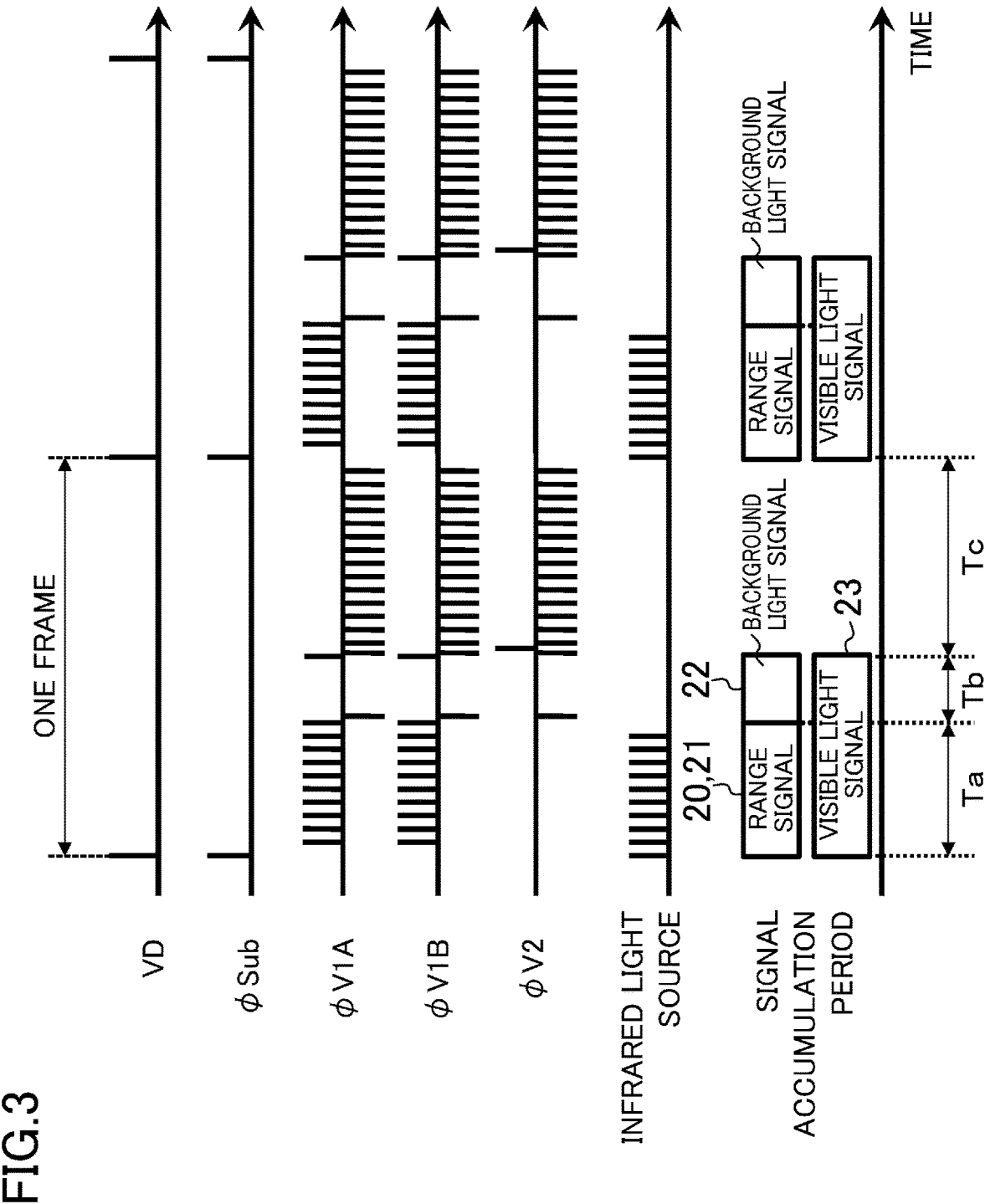
FIG. 3 is a timing chart schematically showing operation of the solid-state image-capturing device of FIG. 2.

FIG. 3 is a timing chart schematically showing operation of the solid-state image-capturing device of FIG. 2. FIGS. 4, 5, 6, and 7 are plan views showing operation of the solid-state image-capturing device of FIG. 2 at respective timings.

Vertical synchronization pulses VD shown in FIG. 3 have a rate of 30 frames per second (fps), for example. During each frame scanning period, a range signal 20, a range signal 21, a background light signal 22, and a visible light signal 23 are obtained for producing a visible light image, and a range image from which an influence of background light has been removed.

A substrate drain pulse φSub is applied to drain signal charge of all pixels at the beginning of each frame. After the end of application of the substrate drain pulse φSub, the accumulation periods of the range signal 20 and the visible light signal 23 begin, and at the same time, the infrared light source 103 emits pulsed infrared light.

Figure 4:
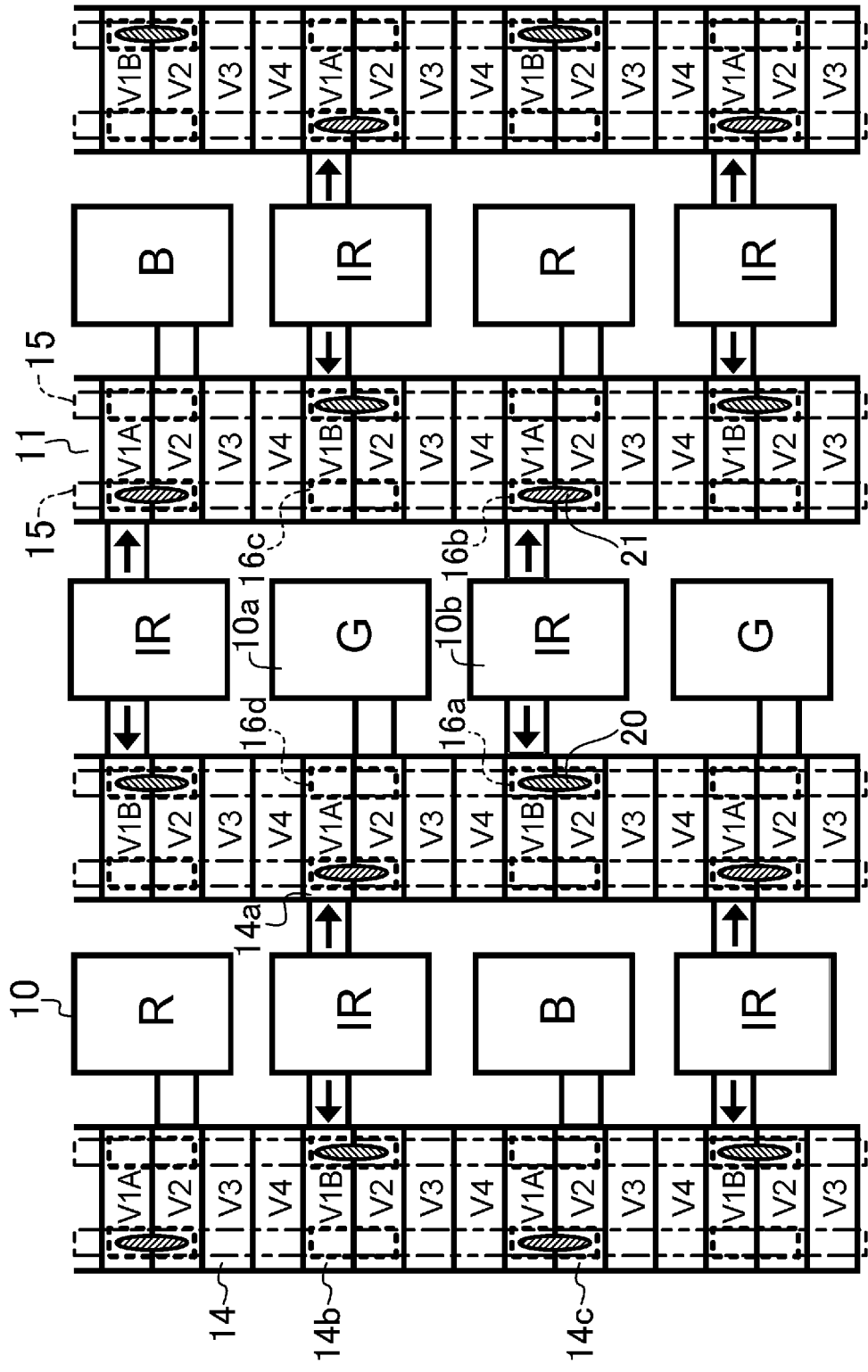
FIG. 4 is a plan view showing operation of the solid-state image-capturing device of FIG. 2 at a certain timing.

During a range signal accumulation period Ta, read pulses φV1A and φV1B are applied, so that, as shown in FIG. 4, the range signal 20 is read out and then accumulated in the signal packet 16a, and also, the range signal 21 is read out and then accumulated in the signal packet 16b.

Figure 5:
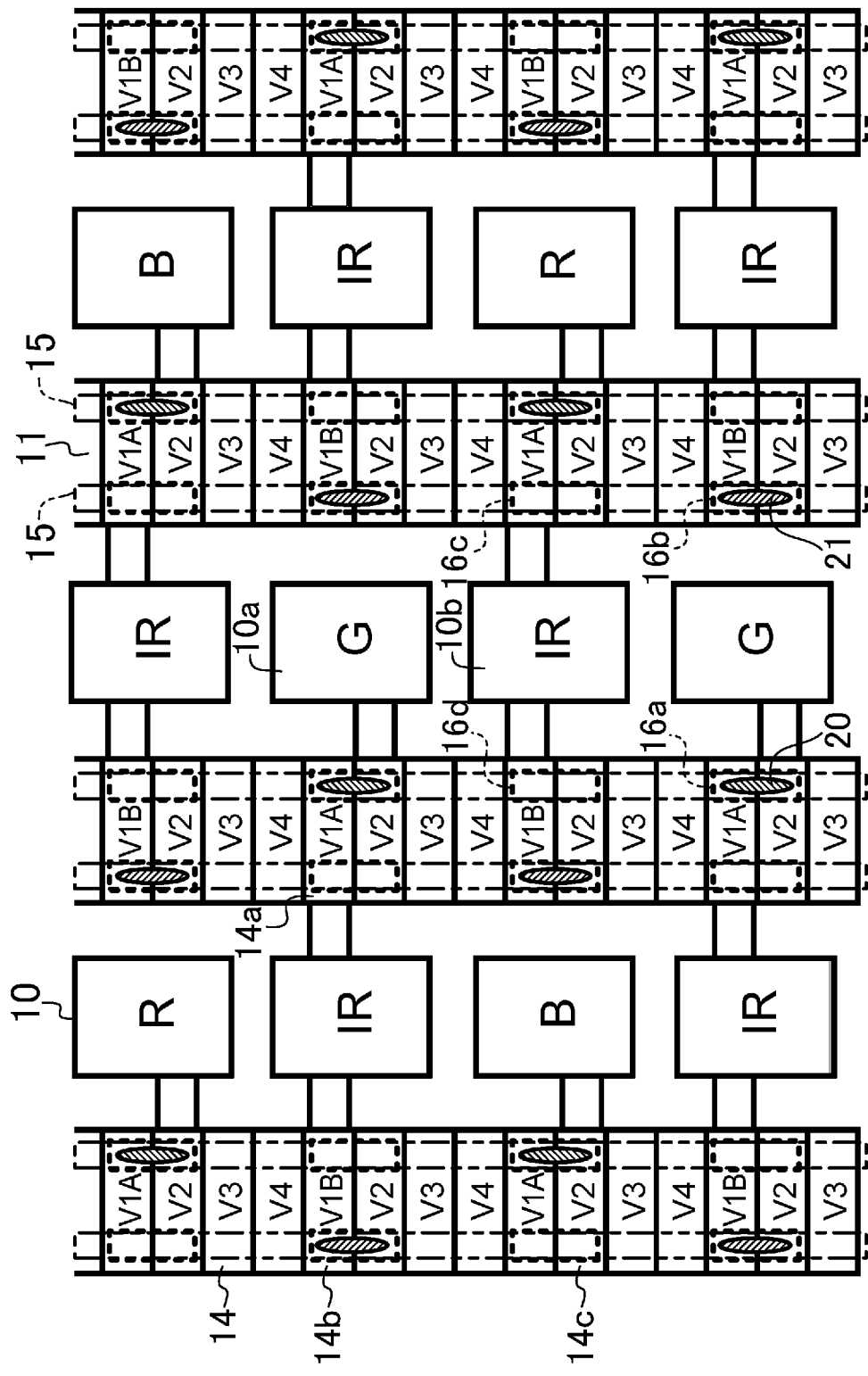
FIG. 5 is a plan view showing operation of the solid-state image-capturing device of FIG. 2 at a timing following the timing of FIG. 4.

After the end of the range signal accumulation period Ta, the infrared light illumination is stopped, and as shown in FIG. 5, the range signal 20 and the range signal 21 are transferred along with the signal packets 16a-16d by one pixel in the forward direction (the downward direction in the drawing).

Figure 6:
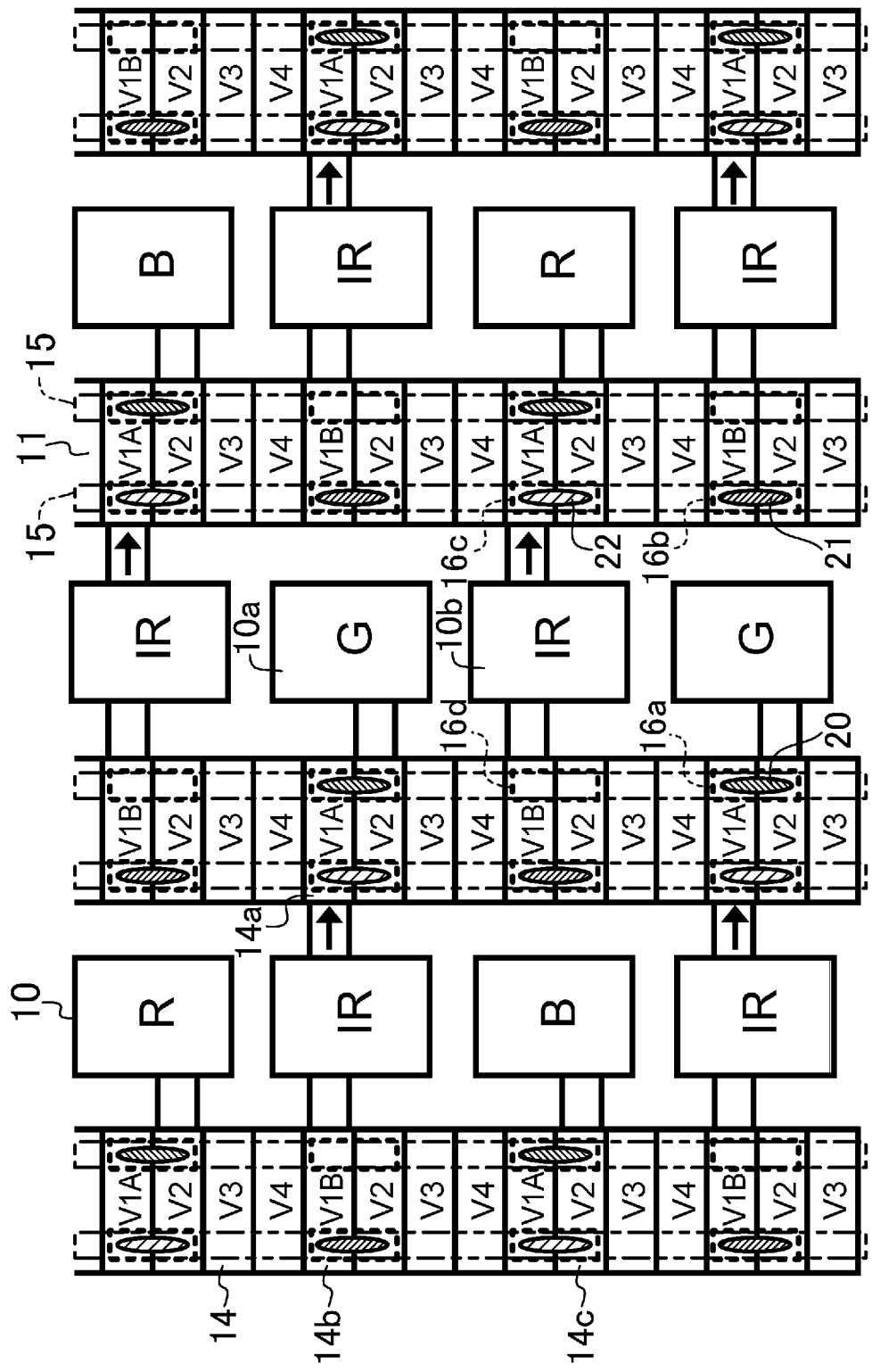
FIG. 6 is a plan view showing operation of the solid-state image-capturing device of FIG. 2 at a timing following the timing of FIG. 5.

During a background light signal accumulation period Tb, background light is emitted during half the range signal accumulation period Ta, i.e., a period of time corresponding to Ta/2, and thereafter, the read pulse φV1A is applied, so that, as shown in FIG. 6, the background light signal 22 is read out and then accumulated in the signal packet 16c.

Figure 7:
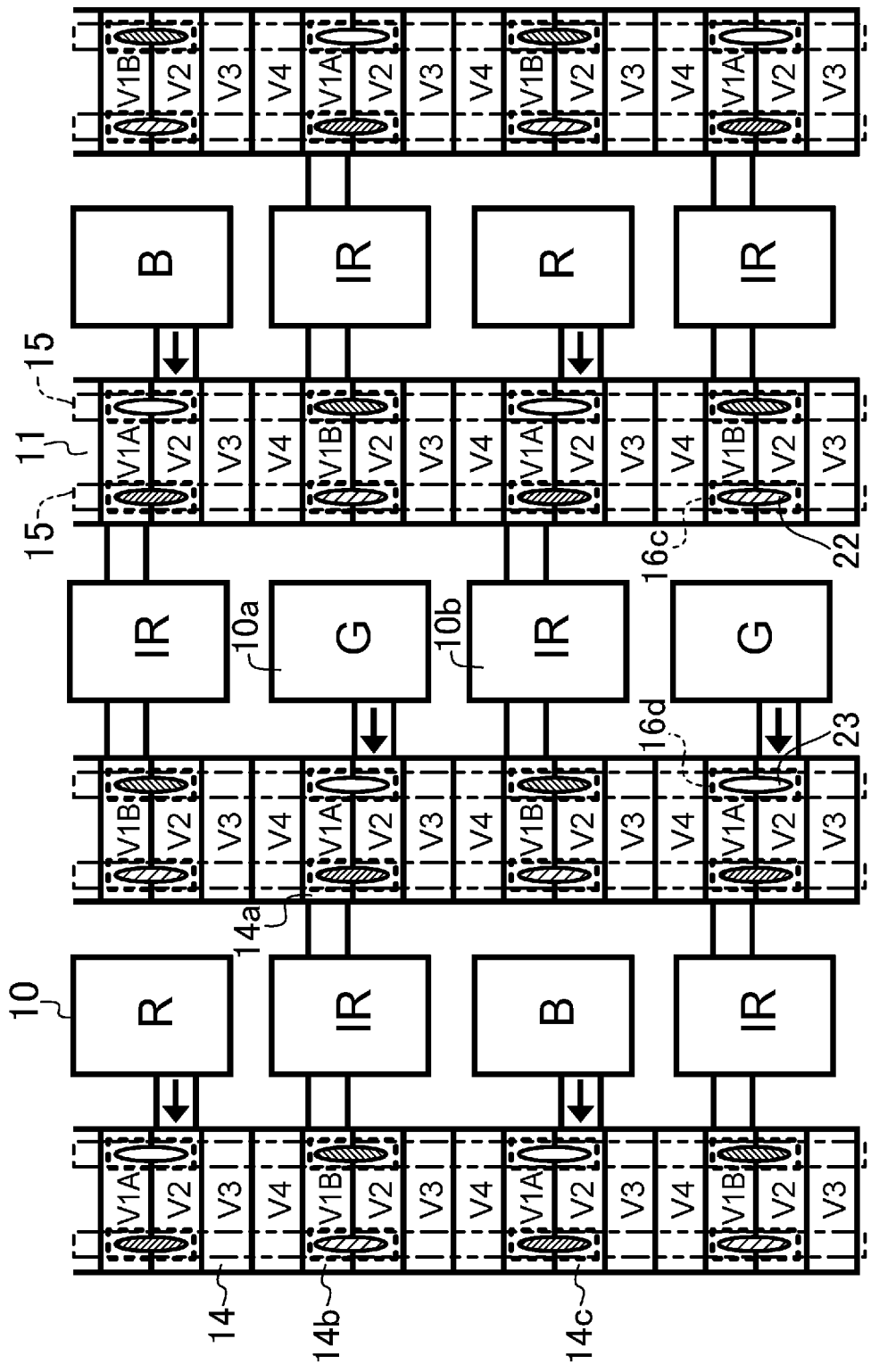
FIG. 7 is a plan view showing operation of the solid-state image-capturing device of FIG. 2 at a timing following the timing of FIG. 6.

After the end of the background light signal accumulation period Tb, as shown in FIG. 7, the range signal 20, the range signal 21, and the background light signal 22 are transferred along with the signal packets 16a-16d by one pixel in the forward direction. Thereafter, the read pulse φV2 is applied, so that the visible light signal 23 is read out and then accumulated in the signal packet 16d.

During a signal transfer period Tc, the vertical transfer unit 11 and the horizontal transfer unit 12 are successively scanned, so that the range signal 20, the range signal 21, the background light signal 22, and the visible light signal 23 are output from the charge detection unit 13.

For production of a range image, initially, a background light component contained in the range signal 20 and the range signal 21 is removed using the background light signal 22.

Figure 8:
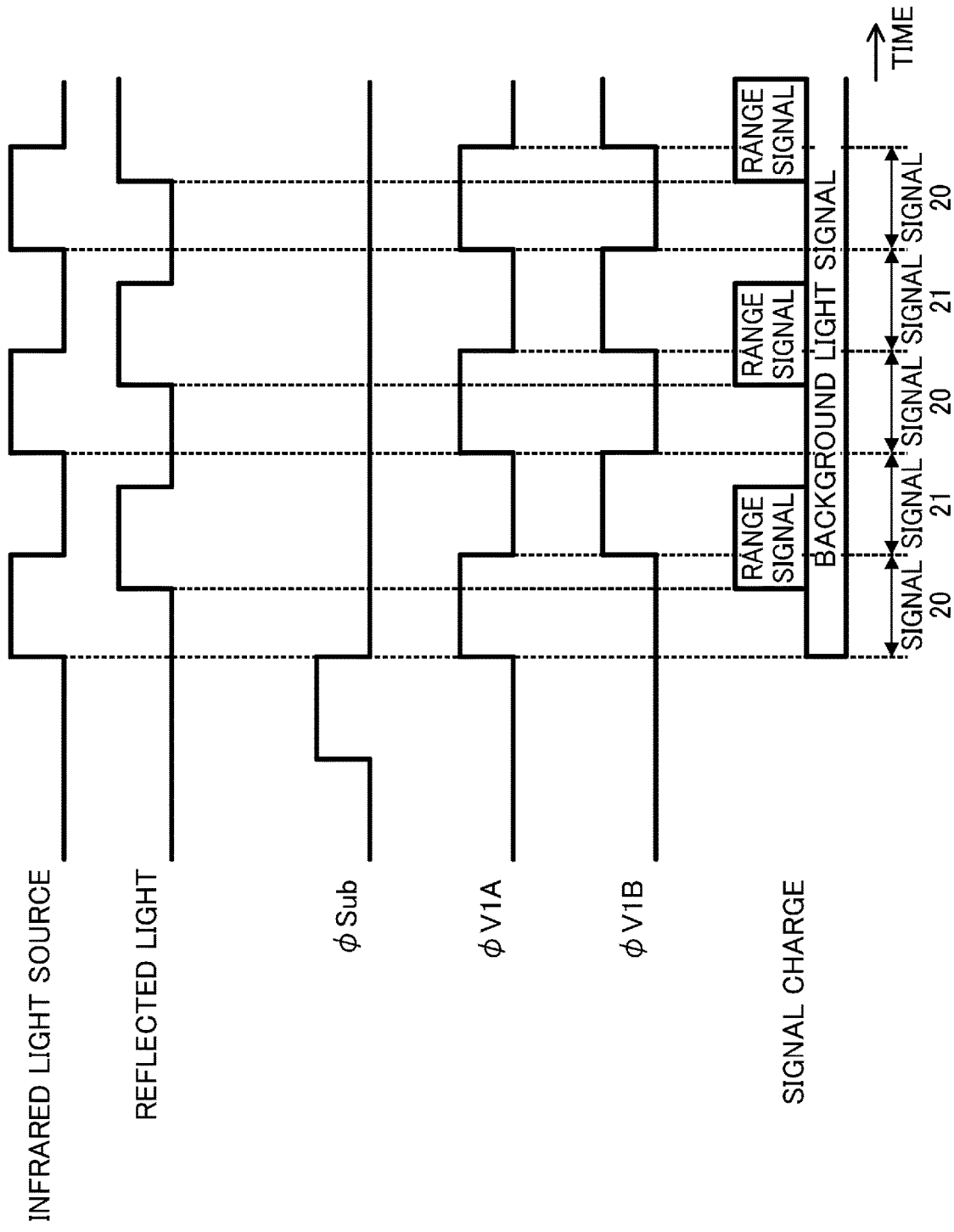
FIG. 8 is a timing chart showing detailed operation of the solid-state image-capturing device of FIG. 2 during a range signal accumulation period.

FIG. 8 is a timing chart showing detailed operation of the solid-state image-capturing device of FIG. 2 during the range signal accumulation period Ta. During the range signal accumulation period Ta, background light is always emitted, so that halves of the background light component are mixed into the range signal 20 and the range signal 21, respectively. As a result, the background light component contained in each range signal is equivalent to the background light signal 22 obtained by illumination with background light during a period of time corresponding to Ta/2. Therefore, by subtracting the background light signal 22 from each of the range signal 20 and the range signal 21, the background light component contained in each range signal can be removed.

Here, the signal ratio of the range signal 20 and the range signal 21 varies depending on a distance to the object 101. Therefore, by calculating the signal ratio of the range signal 20 and the range signal 21 from which the background light component has been removed, an accurate range image (infrared light image) from which an influence of background light has been removed can be produced.

For production of a visible light image, an infrared component contained in the visible light signal 23 is removed using the range signal 20, the range signal 21, and the background light signal 22.

As shown in FIG. 3, during the accumulation period of the visible light signal 23, the range signal 20, the range signal 21, and the background light signal 22 are also simultaneously accumulated, and therefore, their infrared components are mixed into the visible light signal 23. Here, the accumulation period of the visible light signal 23 is set to be equal to the sum of all the accumulation periods of the range signal 20, the range signal 21, and the background light signal 22. Therefore, by subtracting all of the range signal 20, the range signal 21, and the background light signal 22 from the visible light signal 23, the infrared components contained in the visible light signal 23 can be removed, and therefore, a visible light image whose color is highly faithfully reproduced can be produced.

Thus, according to the TOF ranging system of the first embodiment, a signal for producing a visible light image and a signal for producing a range image from which an influence of background light has been removed can be obtained during the same single frame scanning period. Therefore, unlike the conventional art, it is not necessary to use a plurality of frames in order to obtain range information. As a result, the accuracy of range information of a moving object, and the frame rate, can be improved.

Moreover, in the conventional art, it is necessary to obtain a dedicated signal in order to remove an infrared component contained in the visible light signal 23, and therefore, when a visible light image whose color is highly faithfully reproduced is obtained, the frame rate is reduced. According to the TOF ranging system of the first embodiment, the infrared component can be removed using the range signal 20, the range signal 21, and the background light signal 22, and therefore, a visible light image whose color is highly faithfully reproduced can be obtained without a reduction in the frame rate.

Note that, in FIG. 3, the accumulation period of the visible light signal 23 is set to be equal to the sum of all the accumulation periods of the range signal 20, the range signal 21, and the background light signal 22. Alternatively, the accumulation period of the visible light signal 23 can be separately controlled by applying the substrate drain pulse φSub. For example, by applying the substrate drain pulse φSub during the range signal accumulation period Ta, the accumulation period of the visible light signal 23 can be set to be short without substantially changing the accumulation periods of the range signal 20 and the range signal 21. Therefore, the visible light signal 23 is not saturated even when a bright object 101 is shot. Also, when the accumulation period of the visible light signal 23 is separately controlled, the mixed infrared component also changes in proportion to the accumulation period. Therefore, when the range signal 20, the range signal 21, and the background light signal 22 are subtracted from the visible light signal 23, then if a coefficient corresponding to the accumulation period is multiplied before the subtraction, the infrared component mixed into the visible light signal 23 can be removed. Therefore, even when the accumulation period of the visible light signal 23 is separately controlled, a visible light image whose color is highly faithfully reproduced can be obtained.

Each of the visible light photoelectric conversion units 10a may include a filter that cuts out infrared light. As a result, a visible light image whose color is highly faithfully reproduced can be obtained even without the subtraction process for removing the infrared component.

Second Embodiment

Figure 9:
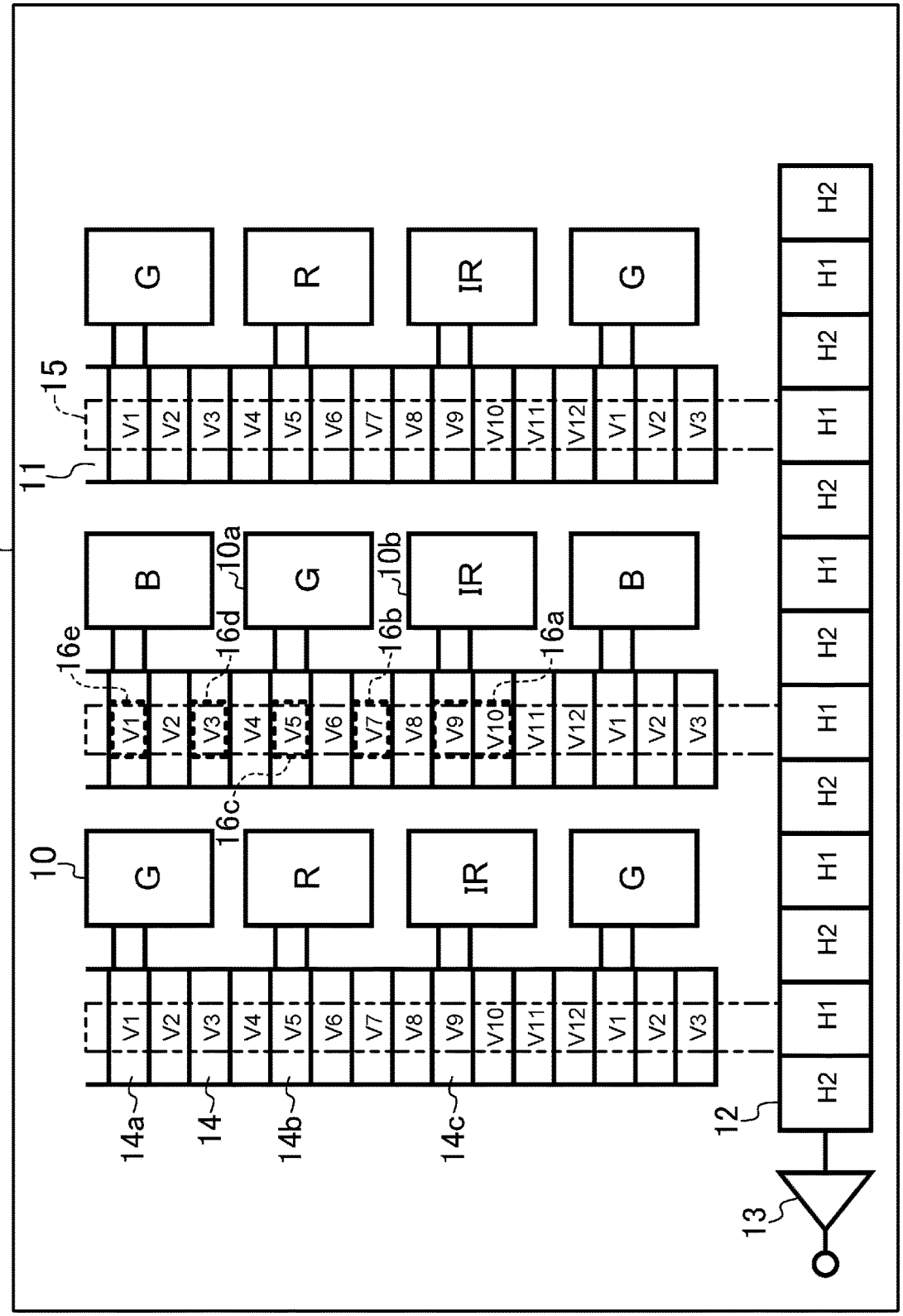
FIG. 9 is a plan view showing a second embodiment of the solid-state image-capturing device in FIG. 1.

FIG. 9 is a plan view showing a second embodiment of the solid-state image-capturing device 105 of FIG. 1. Here, it is assumed that the ranging system of FIG. 1 is of TOF, and the solid-state image-capturing device 105 is a CCD image sensor.

The solid-state image-capturing device of the second embodiment is different from the solid-state image-capturing device of the first embodiment in the filter arrangement of the photoelectric conversion units 10, and the method of reading and accumulating signal charge from the photoelectric conversion units 10, and therefore, the configuration of the vertical transfer unit 11. However, the solid-state image-capturing device of the second embodiment is the same as the solid-state image-capturing device of the first embodiment in that they are intended to provide a structure and drive method that can obtain, during the same single frame scanning period, a signal for producing a visible light image and a signal for producing a range image from which an influence of background light has been removed. The differences between the first and second embodiments will now be mainly described, and the same points will not be described.

The solid-state image-capturing device of FIG. 9 is different from the solid-state image-capturing device of FIG. 2 in the arrangement of the photoelectric conversion units 10b that convert infrared light into signal charge. Also, the vertical transfer unit 11 performs 12-phase drive, where there are 12 vertical transfer electrodes (gates) 14 per 3 pixels, and includes a single vertical transfer path 15 that passes signal charge.

Figure 10:
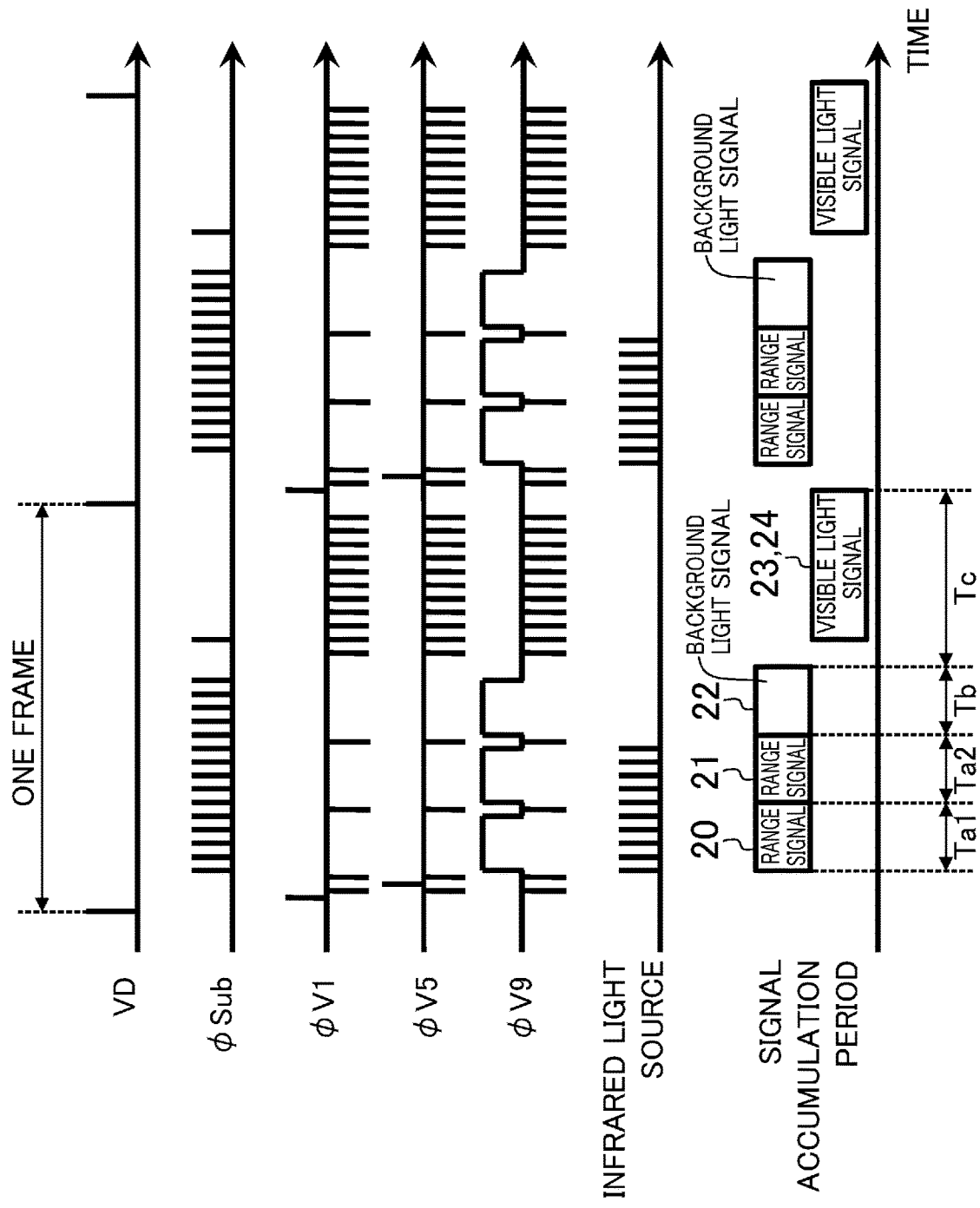
FIG. 10 is a timing chart schematically showing operation of the solid-state image-capturing device of FIG. 9.

FIG. 10 is a timing chart schematically showing operation of the solid-state image-capturing device of FIG. 9, particularly illustrating an example in which a signal for producing a visible light image and a signal for producing a range image from which an influence of background light has been removed are obtained during the same single frame scanning period. FIGS. 11, 12, 13, 14, and 15 are plan views showing operation of the solid-state image-capturing device of FIG. 9 at individual timings.

Figure 11:
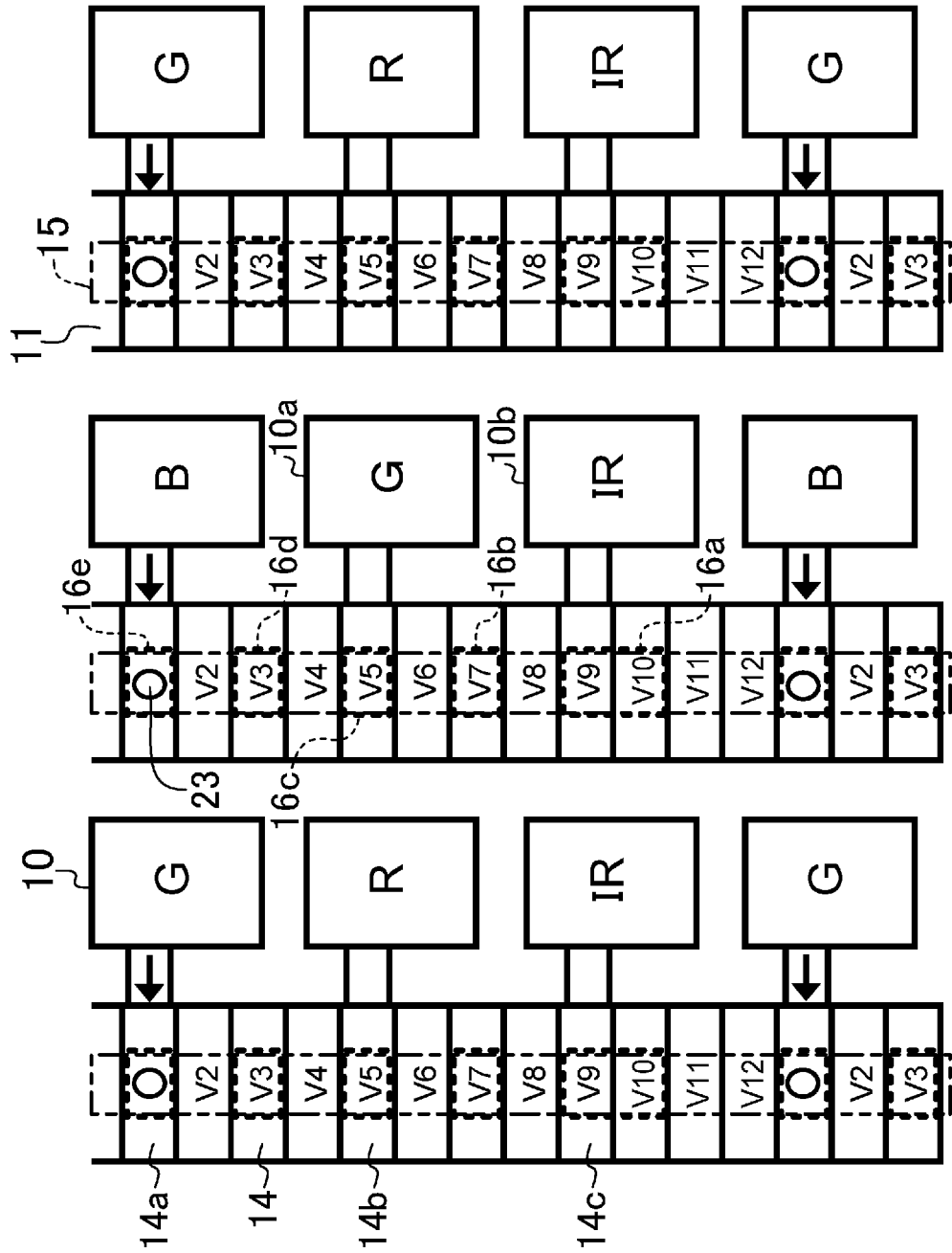
FIG. 11 is a plan view showing operation of the solid-state image-capturing device of FIG. 9 at a certain timing.

Initially, a read pulse φV1 is applied before a first range signal accumulation period Ta1, so that, as shown in FIG. 11, a visible light signal 23 accumulated due to illumination during a signal transfer period Tc of the previous frame is read out and then accumulated in a signal packet 16e.

Figure 12:
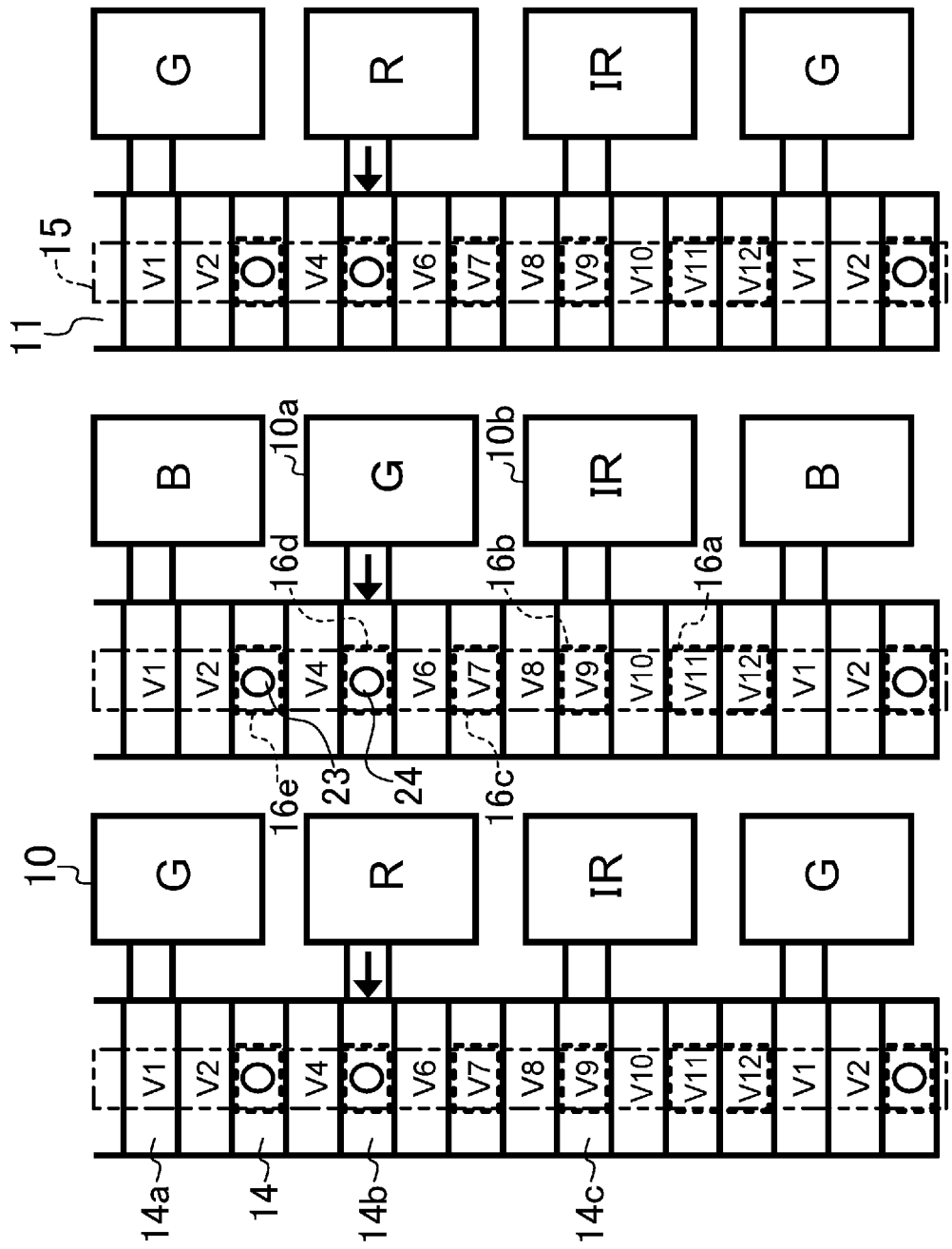
FIG. 12 is a plan view showing operation of the solid-state image-capturing device of FIG. 9 at a timing following the timing of FIG. 11.

Thereafter, as shown in FIG. 12, the visible light signal 23 is transferred along with signal packets 16a-16e by one step in the forward direction. After the transfer, a read pulse φV5 is applied, so that a visible light signal 24 accumulated due to illumination during the signal transfer period Tc of the previous frame is read out and then accumulated in the signal packet 16d.

Figure 13:
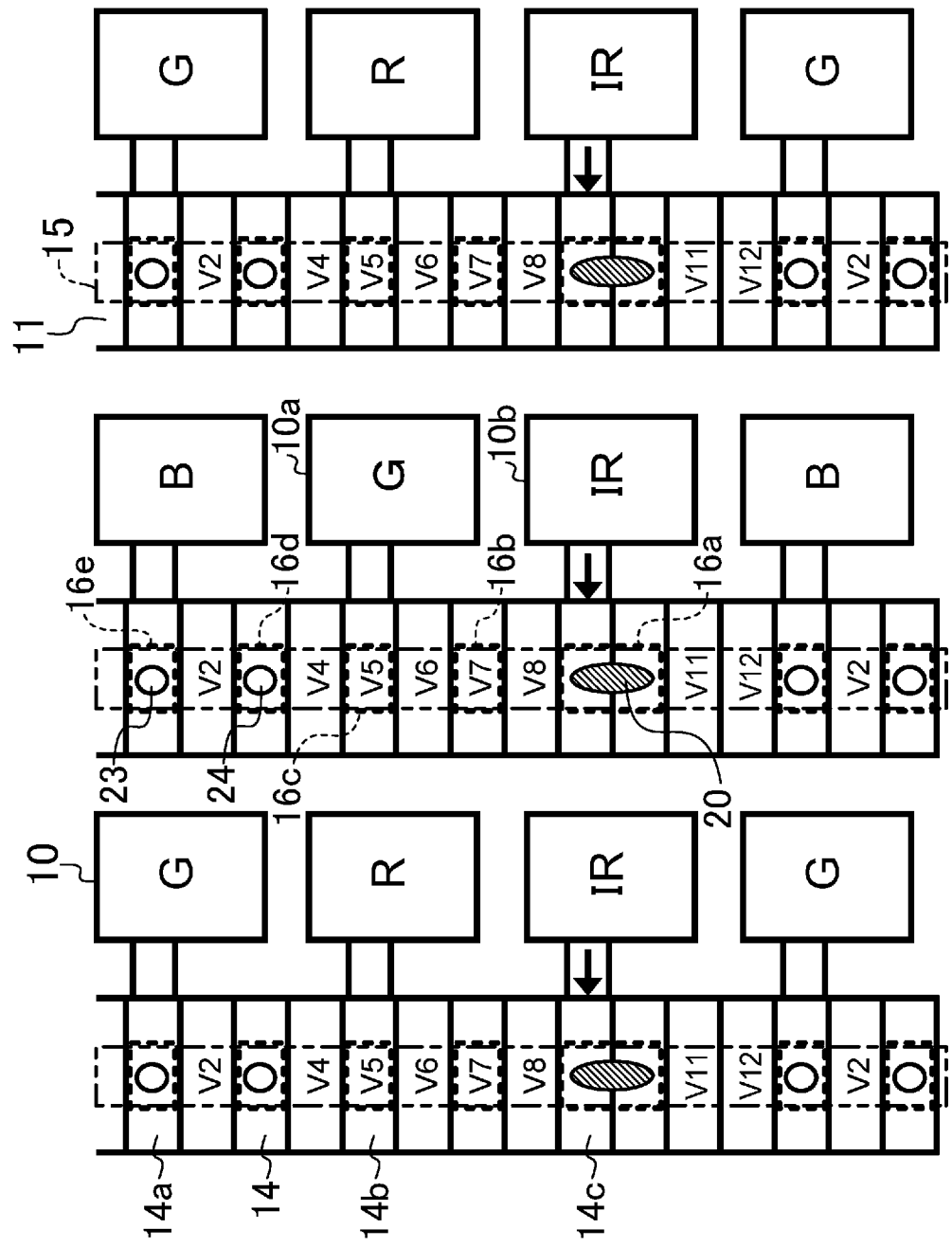
FIG. 13 is a plan view showing operation of the solid-state image-capturing device of FIG. 9 at a timing following the timing of FIG. 12.

Thereafter, as shown in FIG. 13, the visible light signal 23 and the visible light signal 24 are transferred along with the signal packets 16a-16e by one step in the backward direction (the upward direction in the drawing), and the first range signal accumulation period Ta1 begins. During the first range signal accumulation period Ta1, a read pulse φV9 is applied, so that a range signal 20 is read out and then accumulated in the signal packet 16a.

Figure 14:
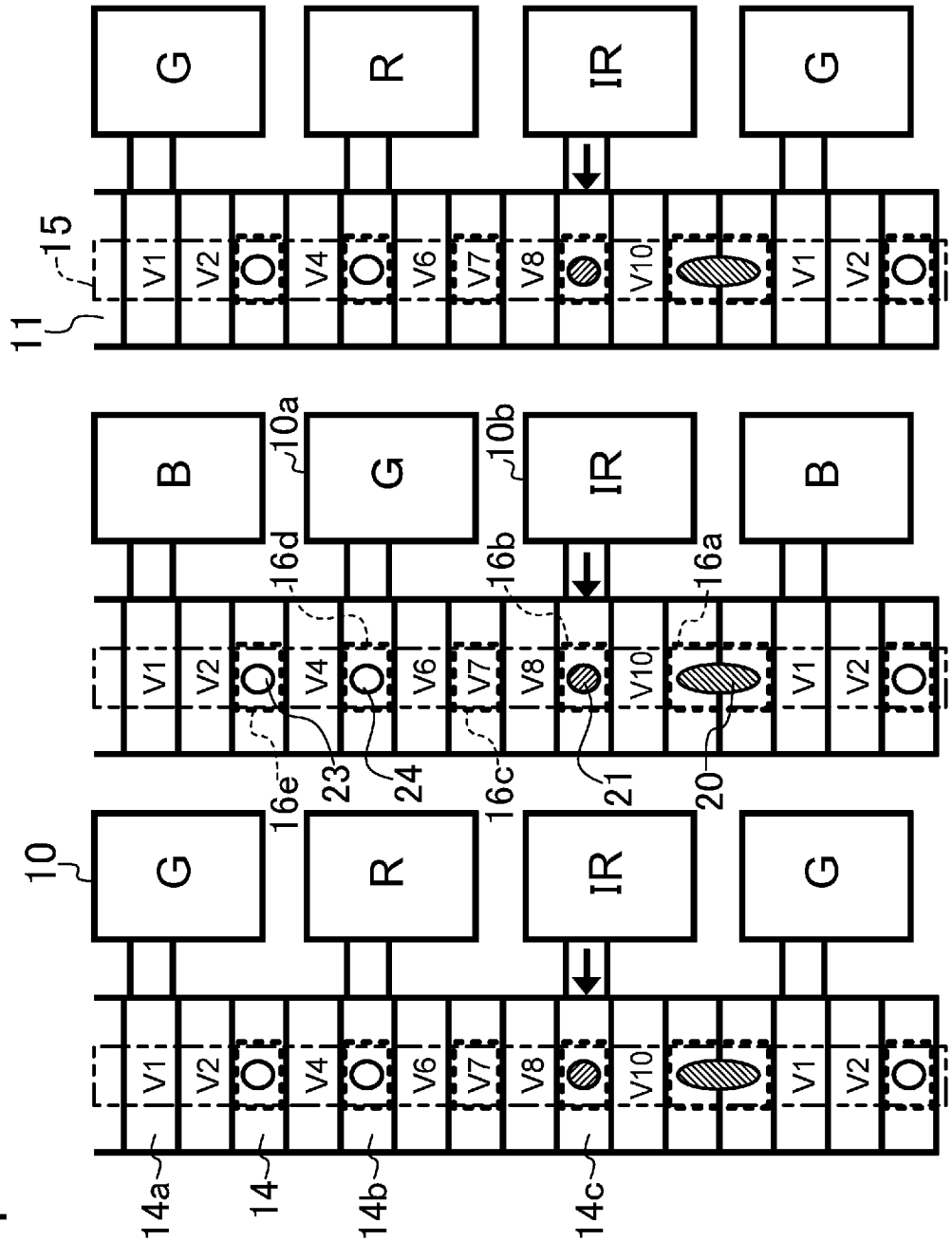
FIG. 14 is a plan view showing operation of the solid-state image-capturing device of FIG. 9 at a timing following the timing of FIG. 13.

After the end of the first range signal accumulation period Ta1, as shown in FIG. 14, the visible light signal 23, the visible light signal 24, and the range signal 20 are transferred along with the signal packets 16a-16e by one step in the forward direction, and a second range signal accumulation period Ta2 begins. During the second range signal accumulation period Ta2, the read pulse φV9 is applied, so that a range signal 21 is read out and then accumulated in the signal packet 16b.

Figure 15:
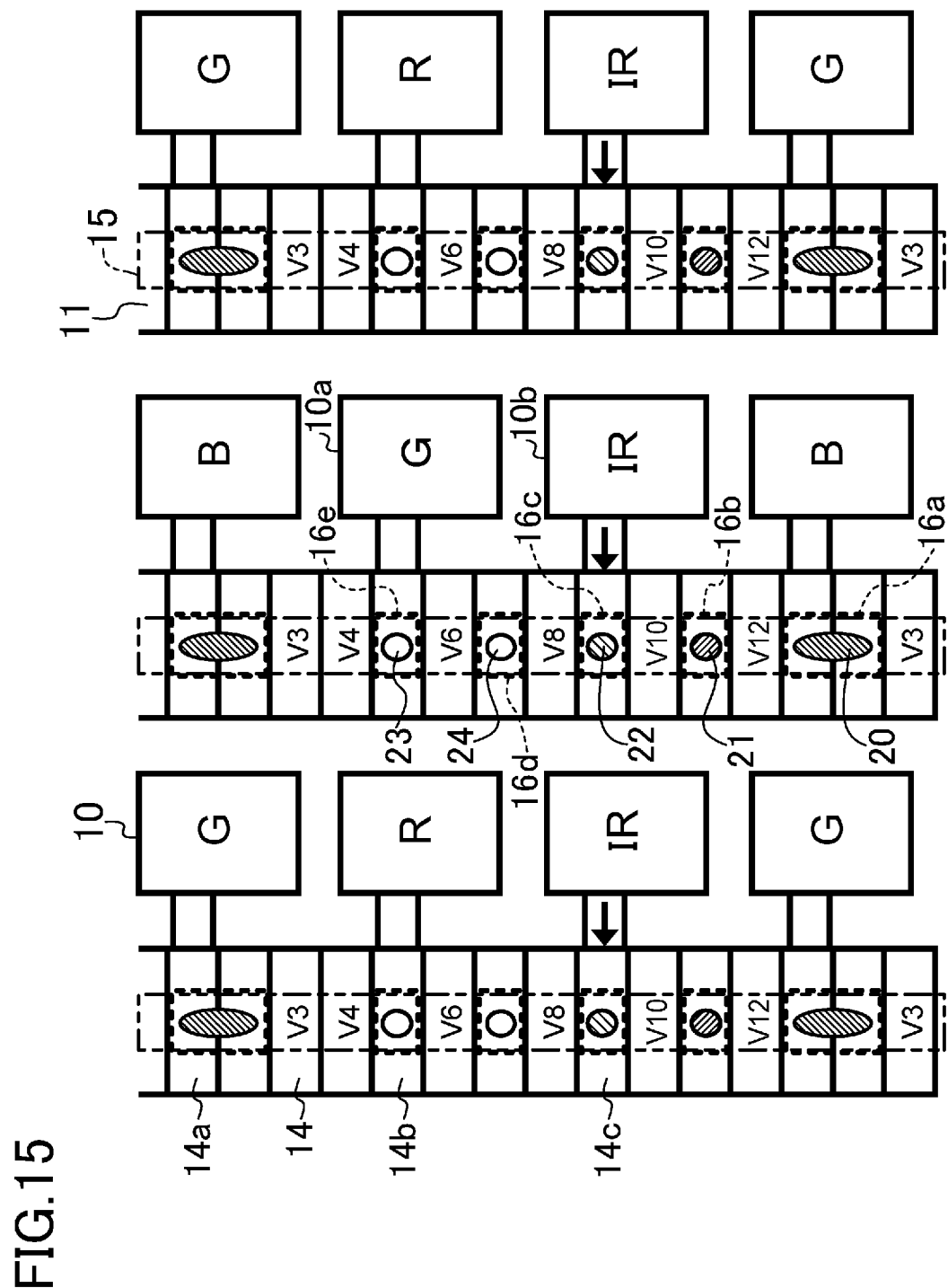
FIG. 15 is a plan view showing operation of the solid-state image-capturing device of FIG. 9 at a timing following the timing of FIG. 14.

After the end of the second range signal accumulation period Ta2, as shown in FIG. 15, the visible light signal 23, the visible light signal 24, the range signal 20, and the range signal 21 are transferred along with the signal packets 16a-16e by one step in the forward direction, and a background light signal accumulation period Tb begins. During the background light signal accumulation period Tb, background light is emitted during a period of time having the same length as that of the first range signal accumulation period Ta1 and the second range signal accumulation period Ta2, and thereafter, the read pulse φV9 is applied, so that a background light signal 22 is read out and then accumulated in the signal packet 16c.

During the signal transfer period Tc, the vertical transfer unit 11 and the horizontal transfer unit 12 are successively scanned, so that the range signal 20, the range signal 21, the background light signal 22, the visible light signal 24, and the visible light signal 23 are successively output.

Figure 16:
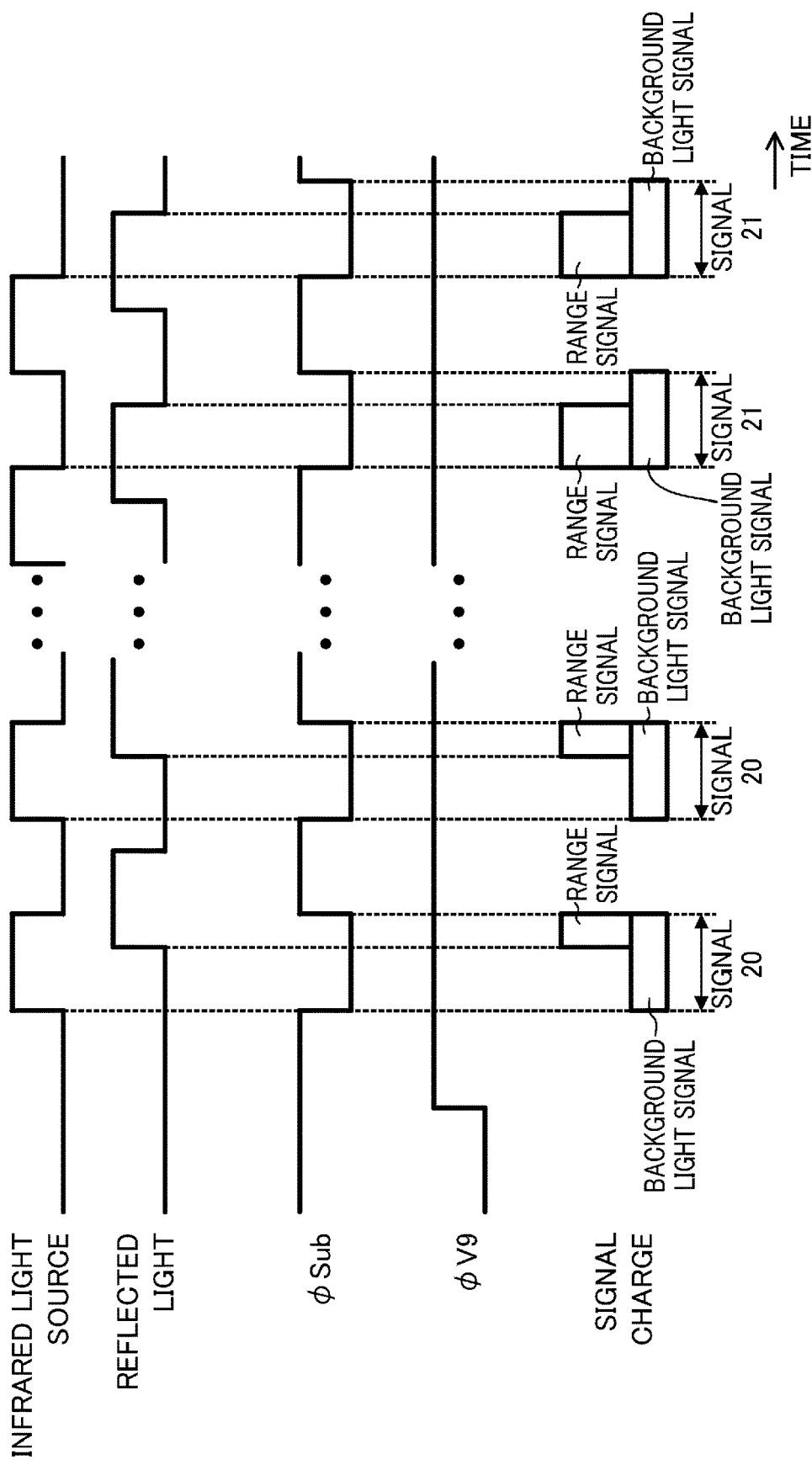
FIG. 16 is a timing chart showing detailed operation of the solid-state image-capturing device of FIG. 9 during a first and a second range signal accumulation period.

FIG. 16 is a timing chart showing detailed operation of the solid-state image-capturing device of FIG. 9 during the first and second range signal accumulation periods Ta1 and Ta2. During the first and second range signal accumulation periods Ta1 and Ta2, the read pulse φV9 applied to the vertical transfer electrode 14c is fixed to a high level, and charge is accumulated when a substrate drain pulse φSub is at a low level.

For production of a range image, background light components contained in the range signal 20 and the range signal 21 are removed using the background light signal 22 as in the solid-state image-capturing device of the first embodiment.

For production of a visible light image, only the visible light signal 24 is additionally provided compared to the TOF ranging system of the first embodiment, and an infrared component contained in the visible light signal 24 is removed using the range signal 20, the range signal 21, and the background light signal 22.

Thus, according to the TOF ranging system of the second embodiment, the number of drive phases of the vertical transfer unit 11 included in the solid-state image-capturing device is increased. As a result, even in the structure in which only one vertical transfer path 15 is provided in each vertical transfer unit 11, a signal for producing a visible light image and a signal for producing a range image from which an influence of background light has been removed, can be obtained during the same single frame scanning period, and therefore, the solid-state image-capturing device can be easily designed and manufactured.

Third Embodiment

Figure 17:
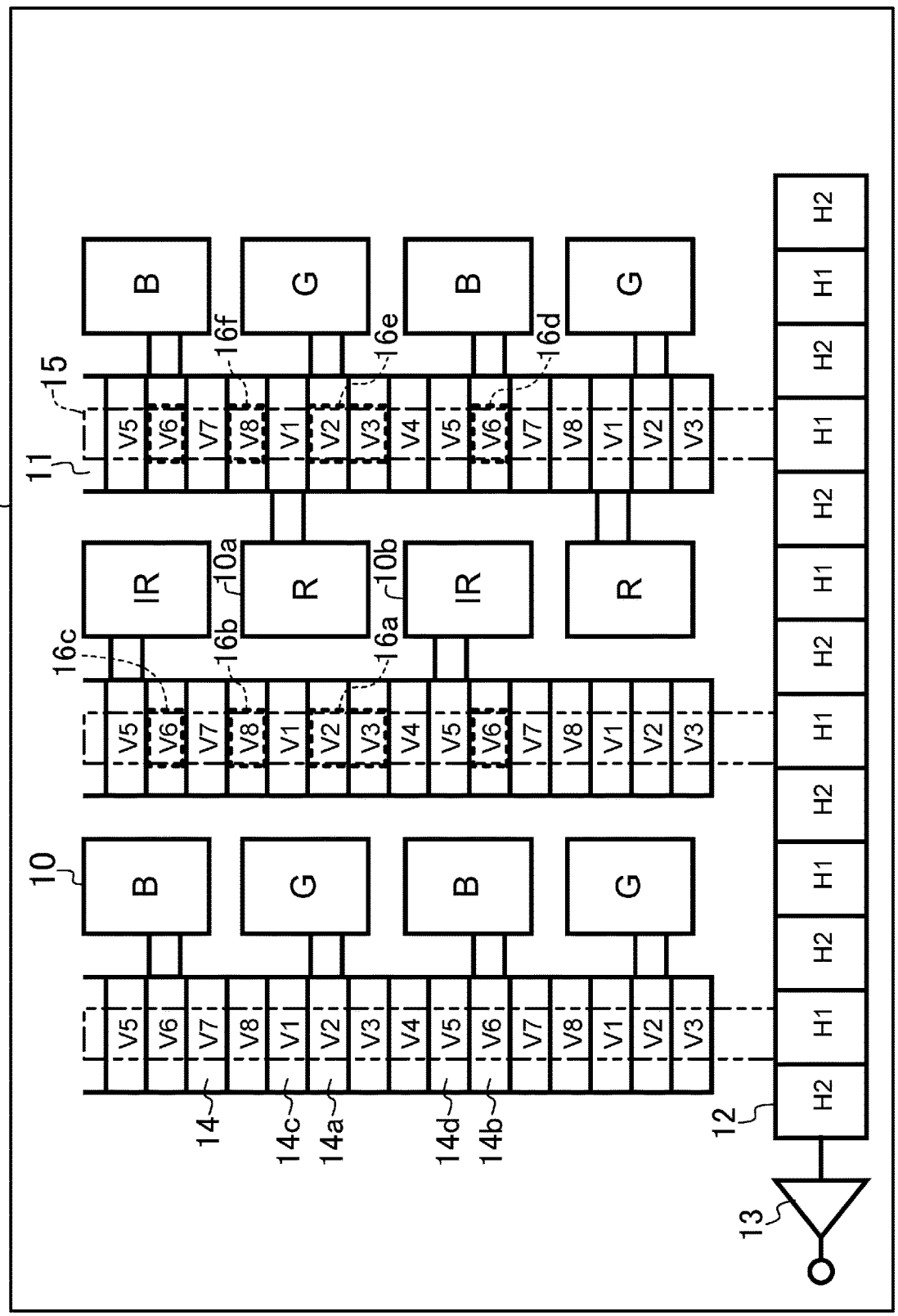
FIG. 17 is a plan view showing a third embodiment of the solid-state image-capturing device in FIG. 1.

FIG. 17 is a plan view showing a third embodiment of the solid-state image-capturing device 105 in FIG. 1. Here, it is assumed that the ranging system of FIG. 1 is of TOF, and the solid-state image-capturing device 105 is a CCD image sensor.

The solid-state image-capturing device of the third embodiment is different from the solid-state image-capturing device of the second embodiment in the filter arrangement of the photoelectric conversion units 10, and the method of reading and accumulating signal charge from the photoelectric conversion units 10, and therefore, the configuration of the vertical transfer unit 11. However, the solid-state image-capturing device of the third embodiment is the same as the solid-state image-capturing device of the second embodiment in that they are intended to provide a structure and drive method that can obtain, during the same single frame scanning period, a signal for producing a visible light image and a signal for producing a range image from which an influence of background light has been removed. The differences between the second and third embodiments will now be mainly described, and the same points will not be described.

The solid-state image-capturing device of FIG. 17 is different from the solid-state image-capturing device of FIG. 9 in the arrangement of the photoelectric conversion units 10b that convert infrared light into signal charge. Also, the vertical transfer unit 11 performs eight-phase drive, where there are eight vertical transfer electrodes (gates) 14 per two pixels, and includes a single vertical transfer path 15 that passes signal charge.

Figure 18:
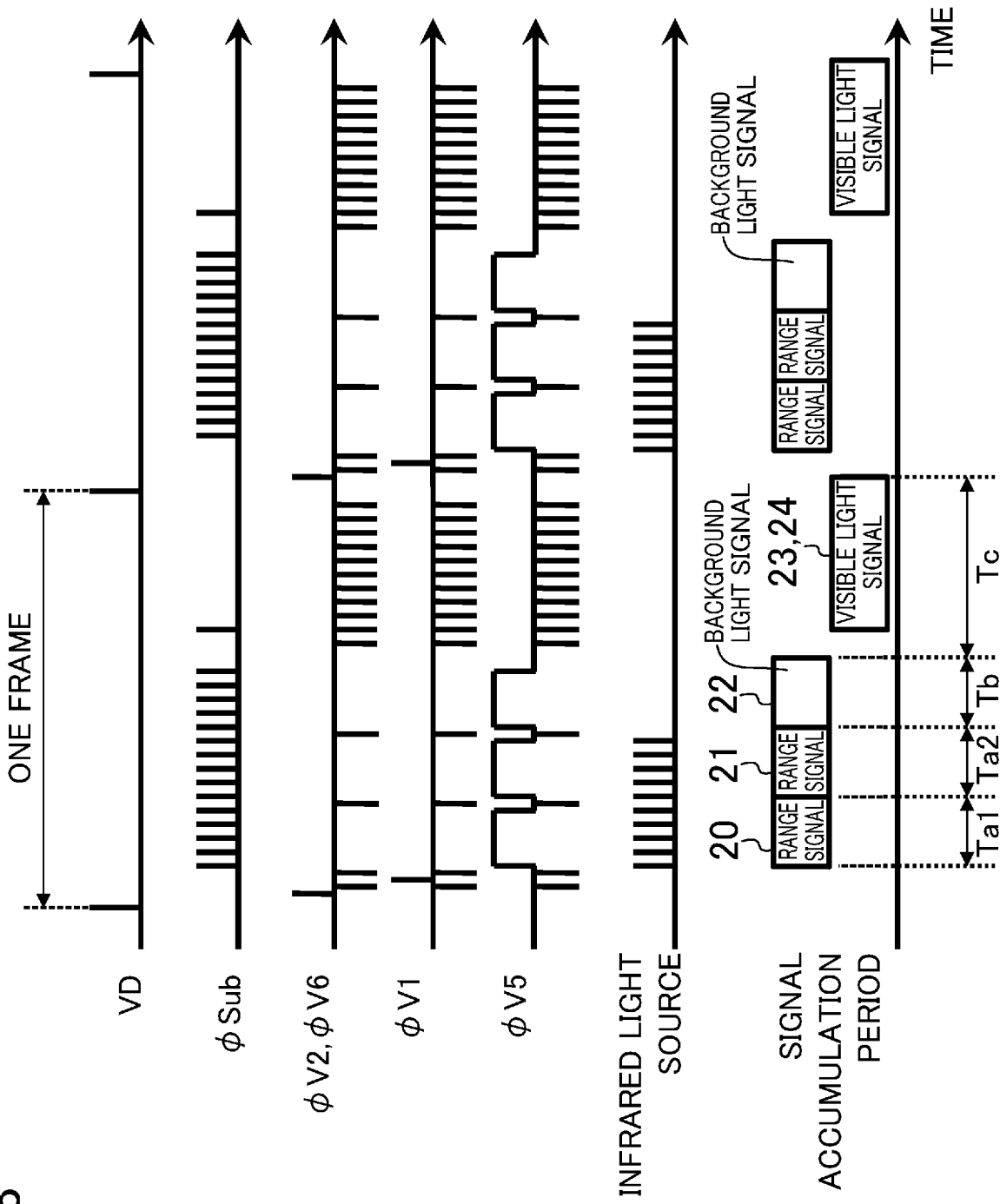
FIG. 18 is a timing chart schematically showing operation of the solid-state image-capturing device of FIG. 17.

FIG. 18 is a timing chart schematically showing operation of the solid-state image-capturing device of FIG. 17, particularly illustrating an example in which a signal for producing a visible light image and a signal for producing a range image from which an influence of background light has been removed are obtained during the same single frame scanning period. FIGS. 19, 20, 21, 22, and 23 are plan views showing operation of the solid-state image-capturing device of FIG. 17 at individual timings.

Figure 19:
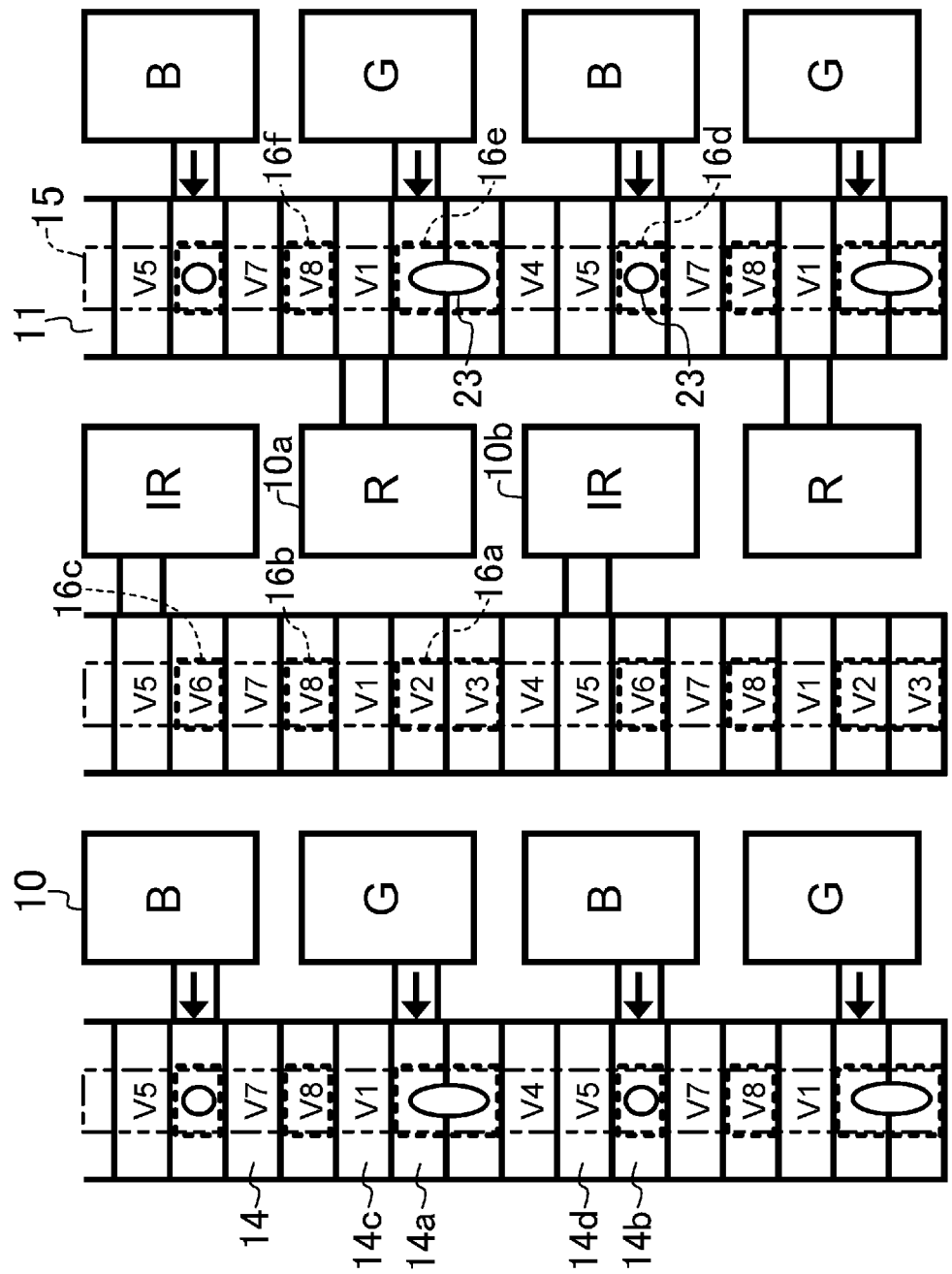
FIG. 19 is a plan view showing operation of the solid-state image-capturing device of FIG. 17 at a certain timing.

Initially, read pulses φV2 and φV6 are applied before a first range signal accumulation period Ta1, so that, as shown in FIG. 19, a visible light signal 23 accumulated due to illumination during a signal transfer period Tc of the previous frame is read out and then accumulated in signal packets 16d and 16e.

Figure 20:
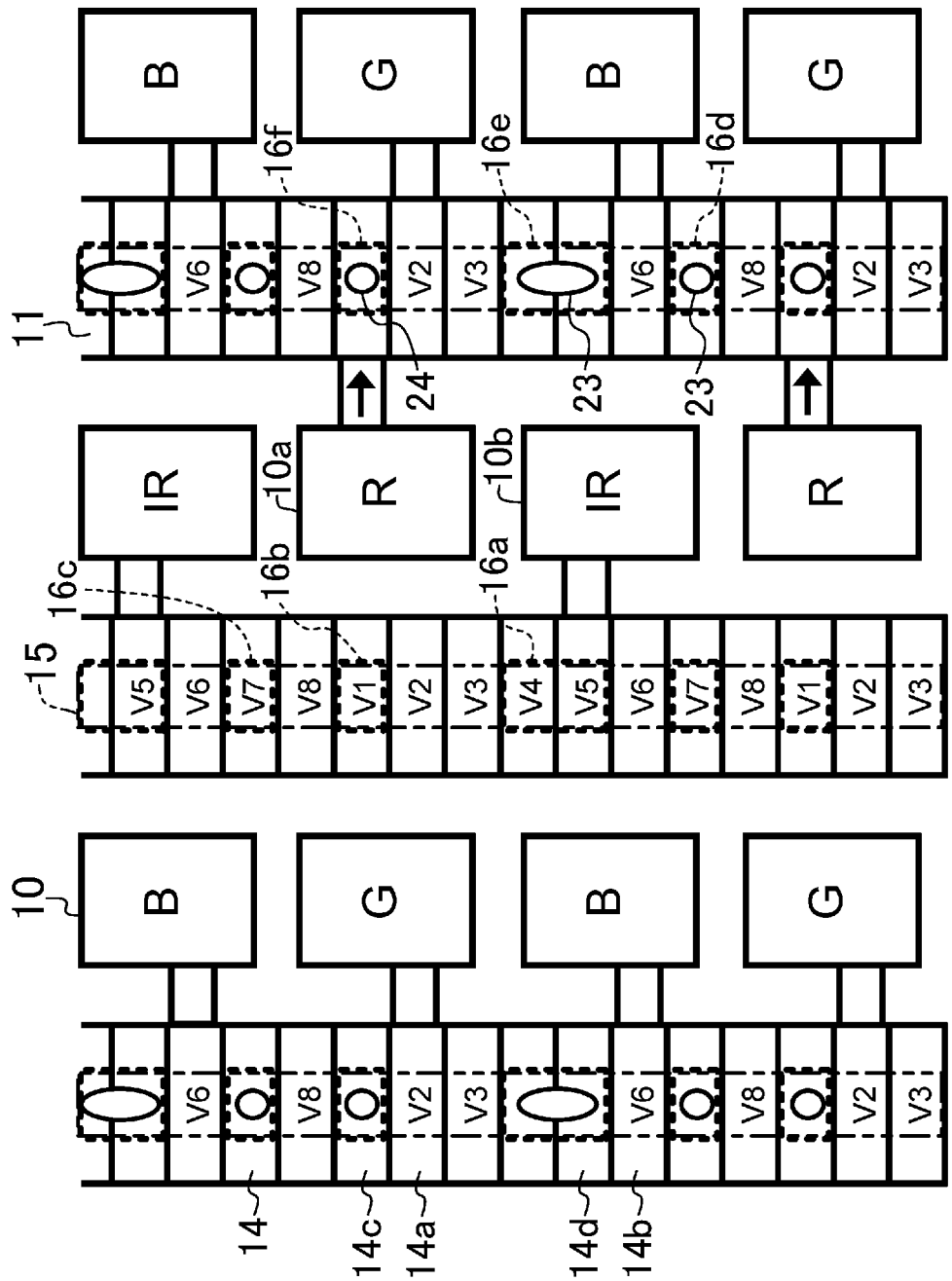
FIG. 20 is a plan view showing operation of the solid-state image-capturing device of FIG. 17 at a timing following the timing of FIG. 19.

Thereafter, as shown in FIG. 20, the visible light signal 23 is transferred along with signal packets 16a-16f by one step in the forward direction. After the transfer, a read pulse φV1 is applied, so that a visible light signal 24 accumulated due to illumination during the signal transfer period Tc of the previous frame is read out and then accumulated in the signal packet 16f.

Figure 21:
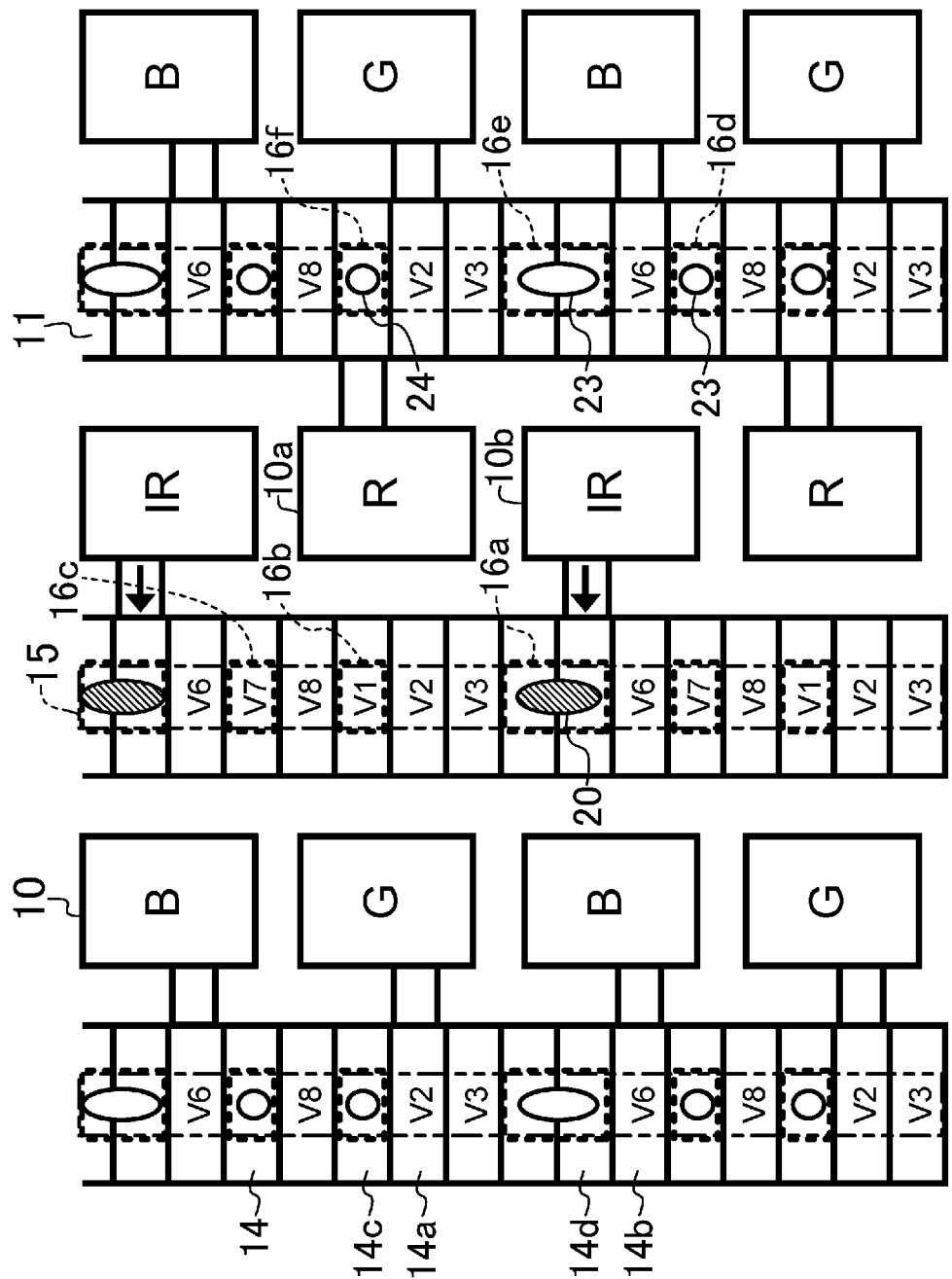
FIG. 21 is a plan view showing operation of the solid-state image-capturing device of FIG. 17 at a timing following the timing of FIG. 20.

Thereafter, when the first range signal accumulation period Ta1 begins, a read pulse φV5 is applied, so that, as shown in FIG. 21, a range signal 20 is read out and then accumulated in the signal packet 16a.

Figure 22:
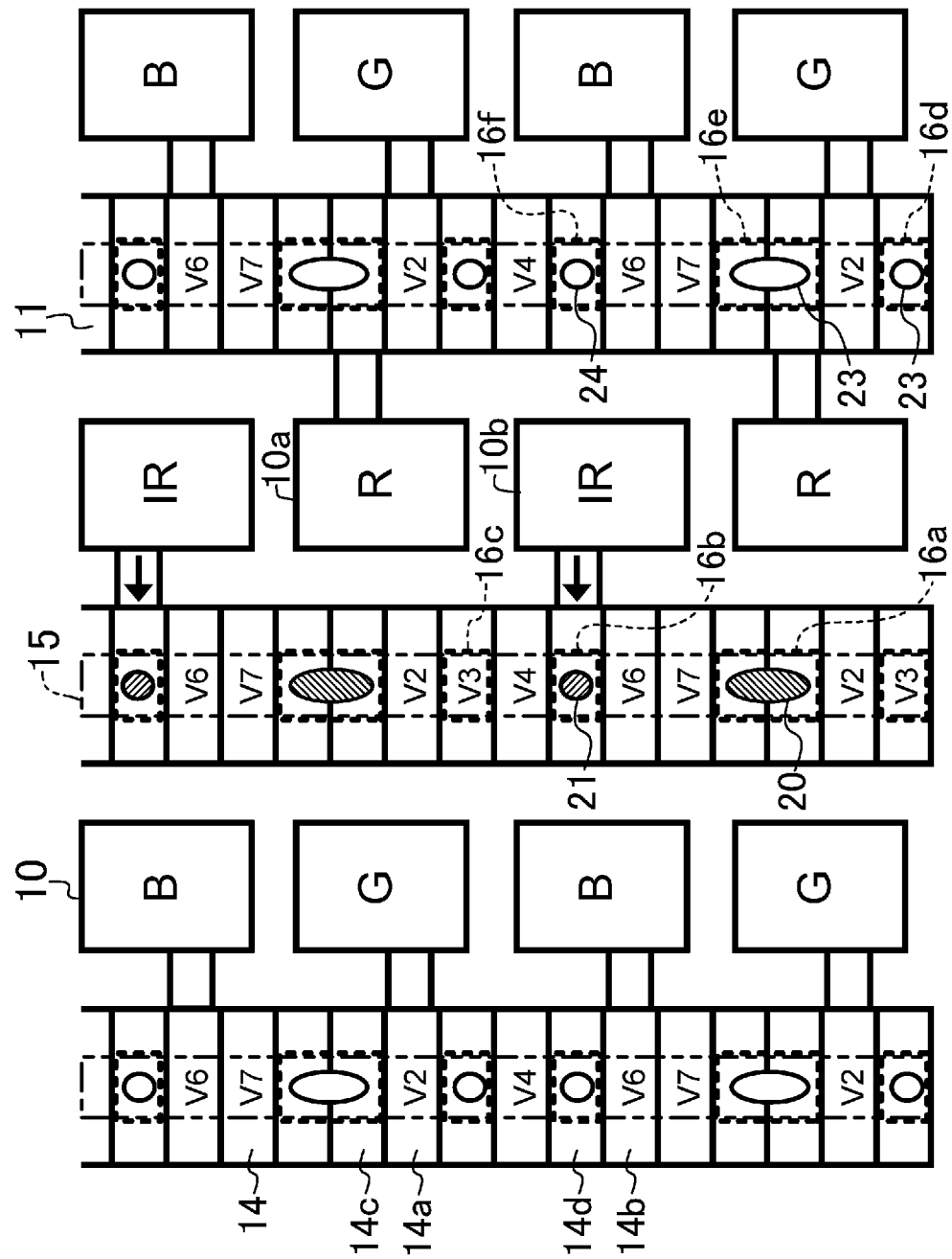
FIG. 22 is a plan view showing operation of the solid-state image-capturing device of FIG. 17 at a timing following the timing of FIG. 21.

After the end of the first range signal accumulation period Ta1, as shown in FIG. 22, the visible light signal 23, the visible light signal 24, and the range signal 20 are transferred along with the signal packets 16a-16f by one step in the forward direction, and a second range signal accumulation period Ta2 begins. During the second range signal accumulation period Ta2, the read pulse φV5 is applied, so that a range signal 21 is read out and then accumulated in the signal packet 16b.

Figure 23:
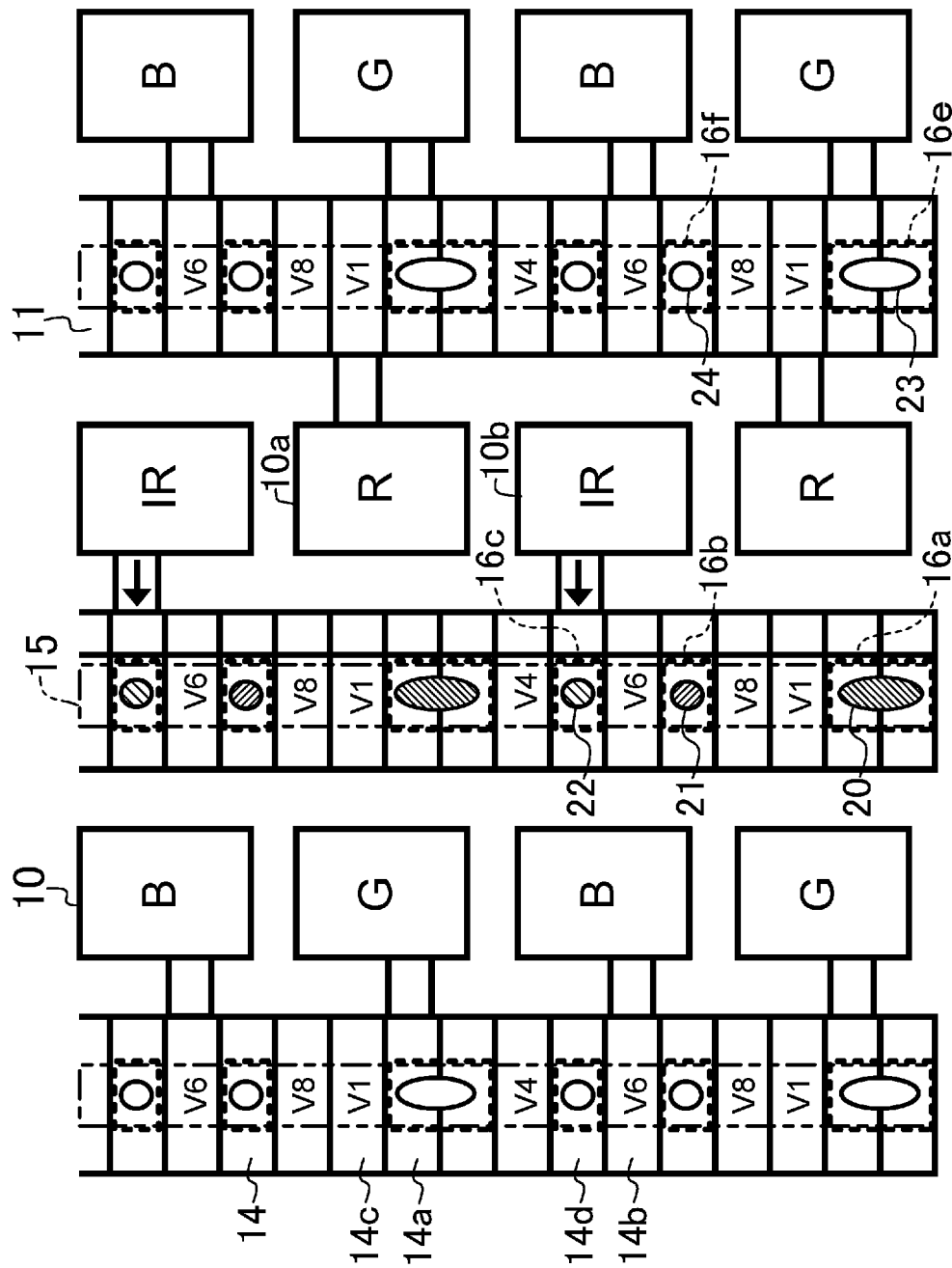
FIG. 23 is a plan view showing operation of the solid-state image-capturing device of FIG. 17 at a timing following the timing of FIG. 22.

After the end of the second range signal accumulation period Ta2, as shown in FIG. 23, the visible light signal 23, the visible light signal 24, the range signal 20, and the range signal 21 are transferred along with the signal packets 16a-16f by one step in the forward direction, and a background light signal accumulation period Tb begins. During the background light signal accumulation period Tb, background light is emitted during a period of time having the same length as that of the first range signal accumulation period Ta1 and the second range signal accumulation period Ta2, and thereafter, the read pulse φV5 is applied, so that a background light signal 22 is read out and then accumulated in the signal packet 16c.

During the signal transfer period Tc, the vertical transfer unit 11 and the horizontal transfer unit 12 are successively scanned, so that the range signal 20, the range signal 21, the background light signal 22, the visible light signal 23, and the visible light signal 24 are successively output.

Figure 24:
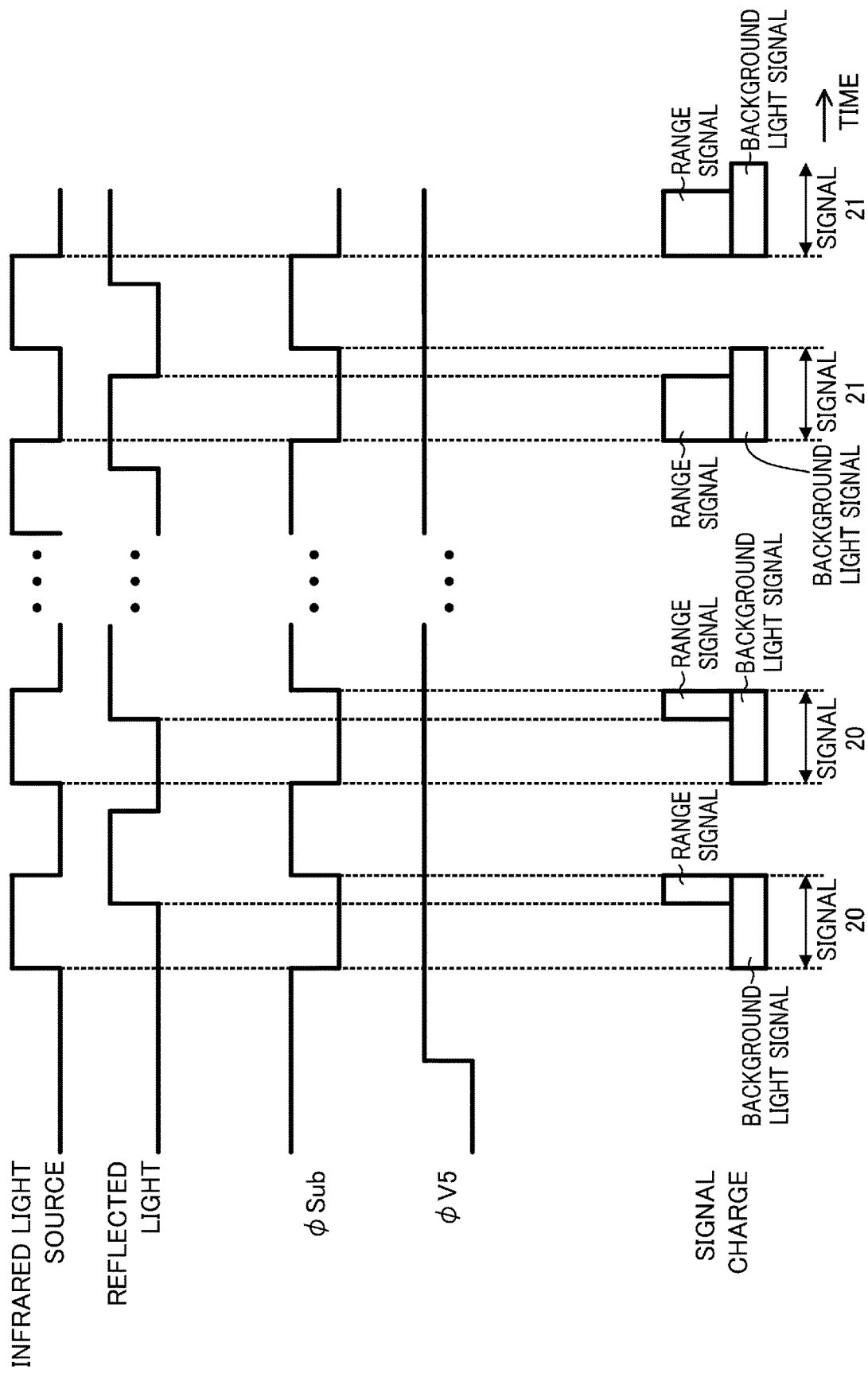
FIG. 24 is a timing chart showing detailed operation of the solid-state image-capturing device of FIG. 17 during a first and a second range signal accumulation period.

FIG. 24 is a timing chart showing detailed operation of the solid-state image-capturing device of FIG. 17 during the first and second range signal accumulation periods Ta1 and Ta2. During the first and second range signal accumulation periods Ta1 and Ta2, the read pulse φV5 applied to the vertical transfer electrode 14d is fixed to a high level, and charge is accumulated when a substrate drain pulse φSub is at a low level.

For production of a range image, background light components contained in the range signal 20 and the range signal 21 are removed using the background light signal 22 as in the solid-state image-capturing device of the second embodiment.

For production of a visible light image, infrared components contained in the visible light signals 23 and 24 are removed using the range signal 20, the range signal 21, and the background light signal 22 as in the TOF ranging system of the second embodiment.

Thus, according to the TOF ranging system of the third embodiment, the filter arrangement of the solid-state image-capturing device can be changed so that, even when the vertical transfer unit 11 performs eight-phase drive, a signal for producing a visible light image and a signal for producing a range image from which an influence of background light has been removed, can be obtained during the same single frame scanning period. Thus, the number of terminals of the solid-state image-capturing device can be reduced compared to 12-phase drive.

Fourth Embodiment

Figure 25:
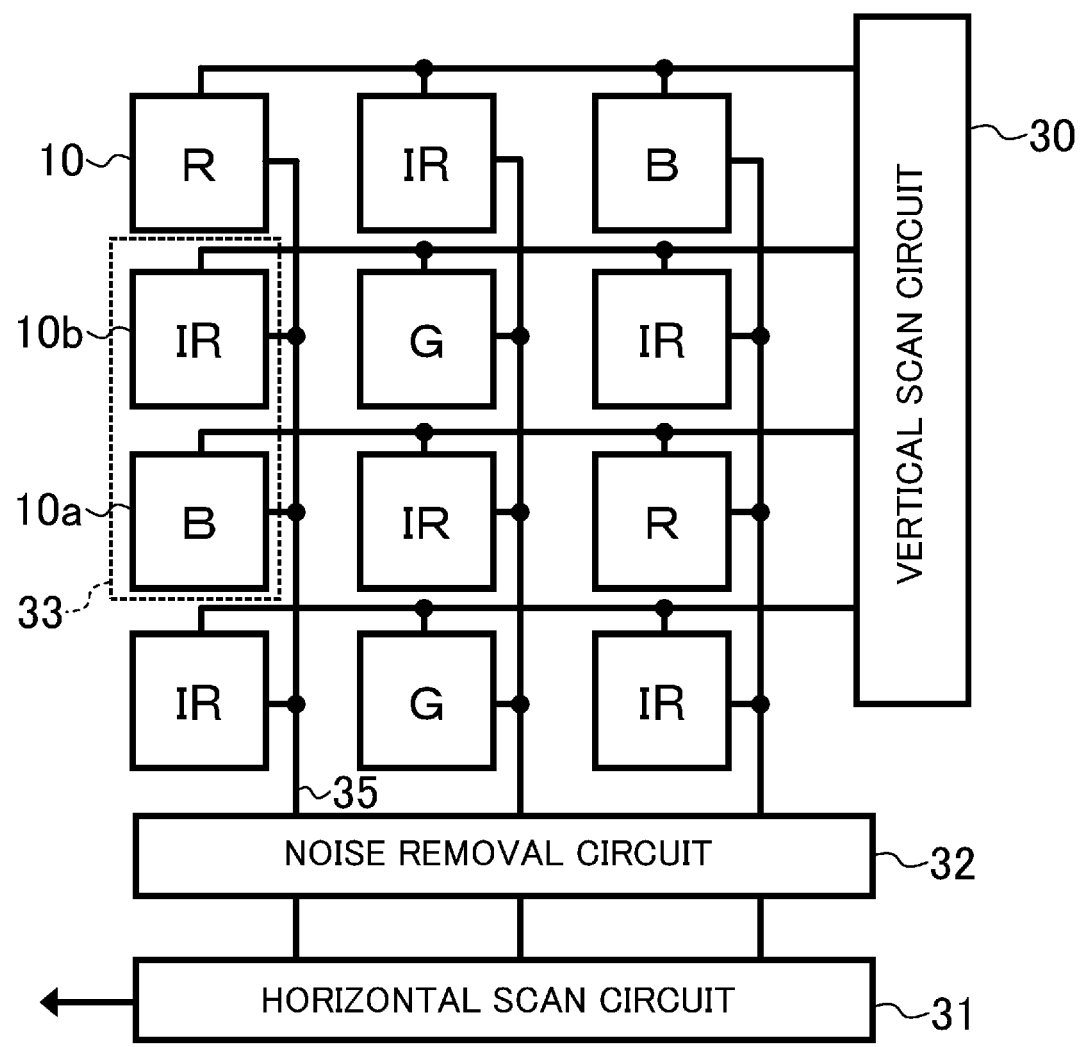
FIG. 25 is a plan view showing a fourth embodiment of the solid-state image-capturing device in FIG. 1.

FIG. 25 is a block diagram showing a fourth embodiment of the solid-state image-capturing device 105 of FIG. 1.

Here, it is assumed that the ranging system of FIG. 1 is of TOF, and the solid-state image-capturing device 105 is a complementary metal oxide semiconductor (CMOS) image sensor.

The solid-state image-capturing device of the fourth embodiment is different from the solid-state image-capturing device of the first embodiment in that a CMOS image sensor is used as the solid-state image-capturing device. However, the solid-state image-capturing device of the fourth embodiment is the same as the solid-state image-capturing device of the first embodiment in that they are intended to provide a structure and drive method that can obtain, during the same single frame scanning period, a signal for producing a visible light image and a signal for producing a range image from which an influence of background light has been removed. The differences between the first and fourth embodiments will now be mainly described, and the same points will not be described.

The solid-state image-capturing device of FIG. 25 includes a plurality of photoelectric conversion units 10 arranged on a semiconductor substrate in a matrix. The photoelectric conversion units 10 are divided into a plurality of photoelectric conversion units 10a that convert visible light into signal charge and a plurality of photoelectric conversion units 10b that convert infrared light into signal charge. Each of the visible light photoelectric conversion units 10a includes a filter that selectively transmits red (R), green (G), or blue (B) light. Each of the infrared light photoelectric conversion units 10b includes a filter that selectively transmits infrared (IR) light. The solid-state image-capturing device of FIG. 25 further includes a vertical scan circuit 30, vertical signal lines 35, and horizontal scan circuit 31 for scanning and outputting signals read from the photoelectric conversion units 10a and 10b. To remove noise, a noise removal circuit 32 is also provided for each column.

Figure 26:
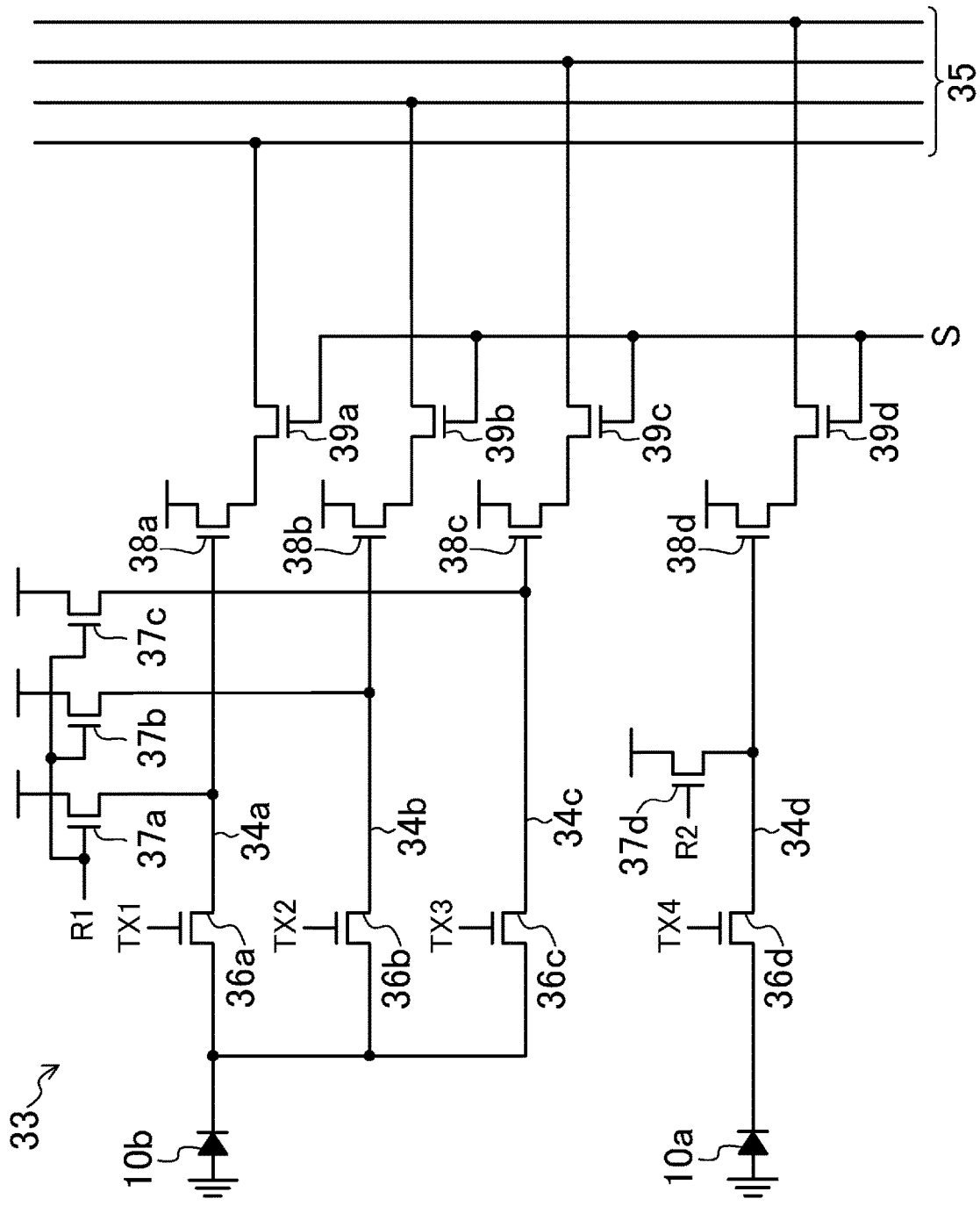
FIG. 26 is a circuit diagram showing a detailed example configuration of a pixel region of interest in FIG. 25.

FIG. 26 is a circuit diagram showing a detailed example configuration of a pixel region 33 of interest in FIG. 25. The pixel region 33 includes a visible light photoelectric conversion unit 10a and an infrared light photoelectric conversion unit 10b that are adjacent to each other.

To output a plurality of signals per pixel, the infrared light photoelectric conversion unit 10b includes a plurality of control signal lines TX1-TX3, a plurality of floating regions 34a, 34b, and 34c each of which accumulates signal charge that has been read out, a plurality of signal transfer units 36a, 36b, and 36c that transfer signal charge obtained by photoelectric conversion to the floating regions 34a, 34b, and 34c, respectively, a plurality of resetting units 37a, 37b, and 37c that reset potentials of the floating regions 34a, 34b, and 34c, respectively, a plurality of signal amplification units 38a, 38b, and 38c that perform signal amplification based on the potentials of the floating regions 34a, 34b, and 34c, respectively, and a plurality of selection units 39a, 39b, and 39c that selectively output signals amplified by the signal amplification units 38a, 38b, and 38c, respectively. The visible light photoelectric conversion unit 10a includes a control signal line TX4, a floating region 34d that accumulates signal charge that has been read out, a signal transfer unit 36d that transfers signal charge obtained by photoelectric conversion to the floating region 34d, a resetting unit 37d that resets a potential of the floating region 34d, a signal amplification unit 38d that performs signal amplification based on the potential of the floating region 34d, and a selection unit 39d that selectively outputs a signal amplified by the signal amplification unit 38d.

The signals accumulated in the floating regions 34a-34d are output through the respective corresponding vertical signal lines 35 at a timing when a pulse is applied to a selection signal line S. The signals accumulated in the floating regions 34a-34d are reset at a timing when a pulse is applied to resetting signal lines R1 and R2.

Figure 27:
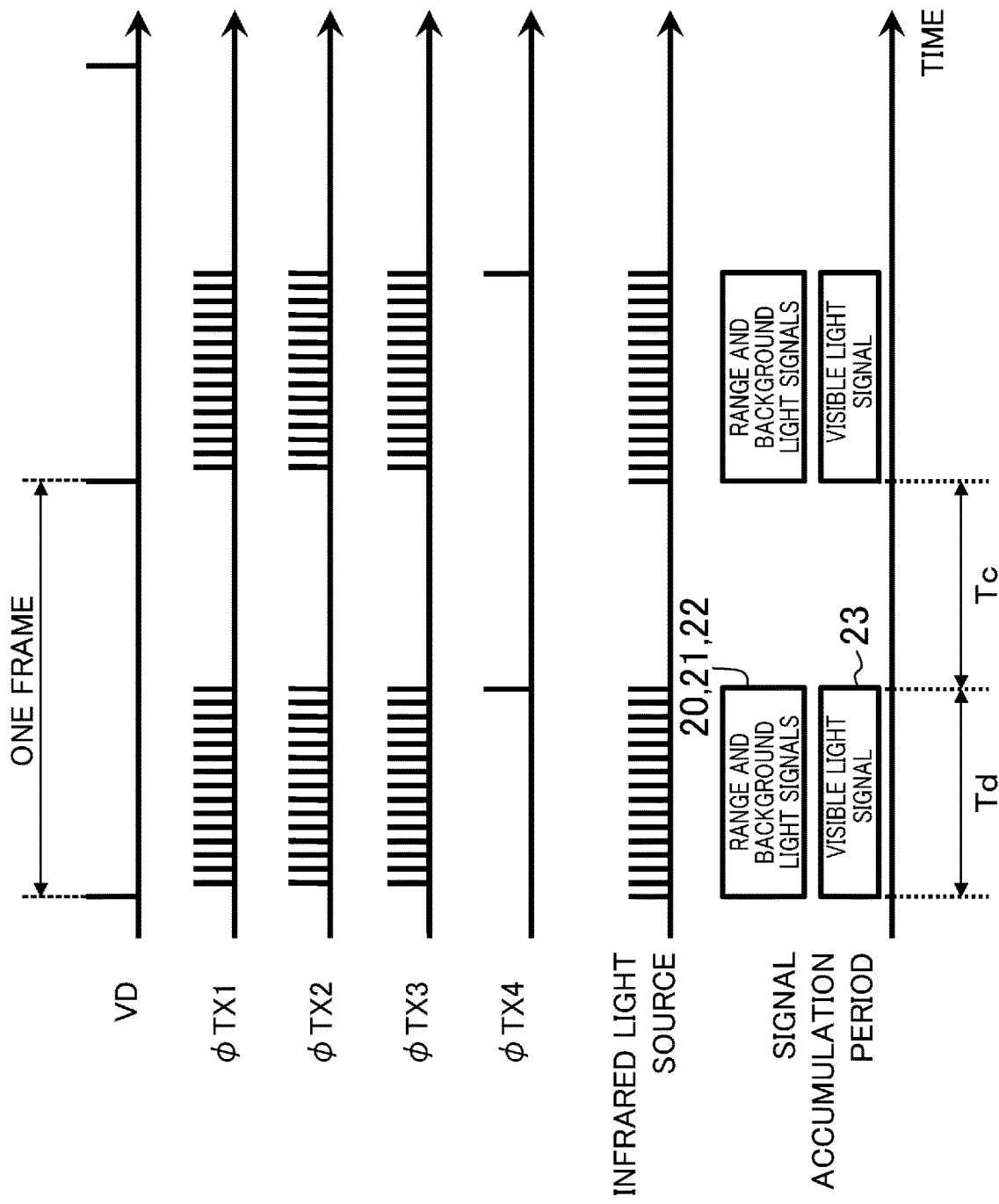
FIG. 27 is a timing chart schematically showing operation of the solid-state image-capturing device of FIG. 25.
Figure 28:
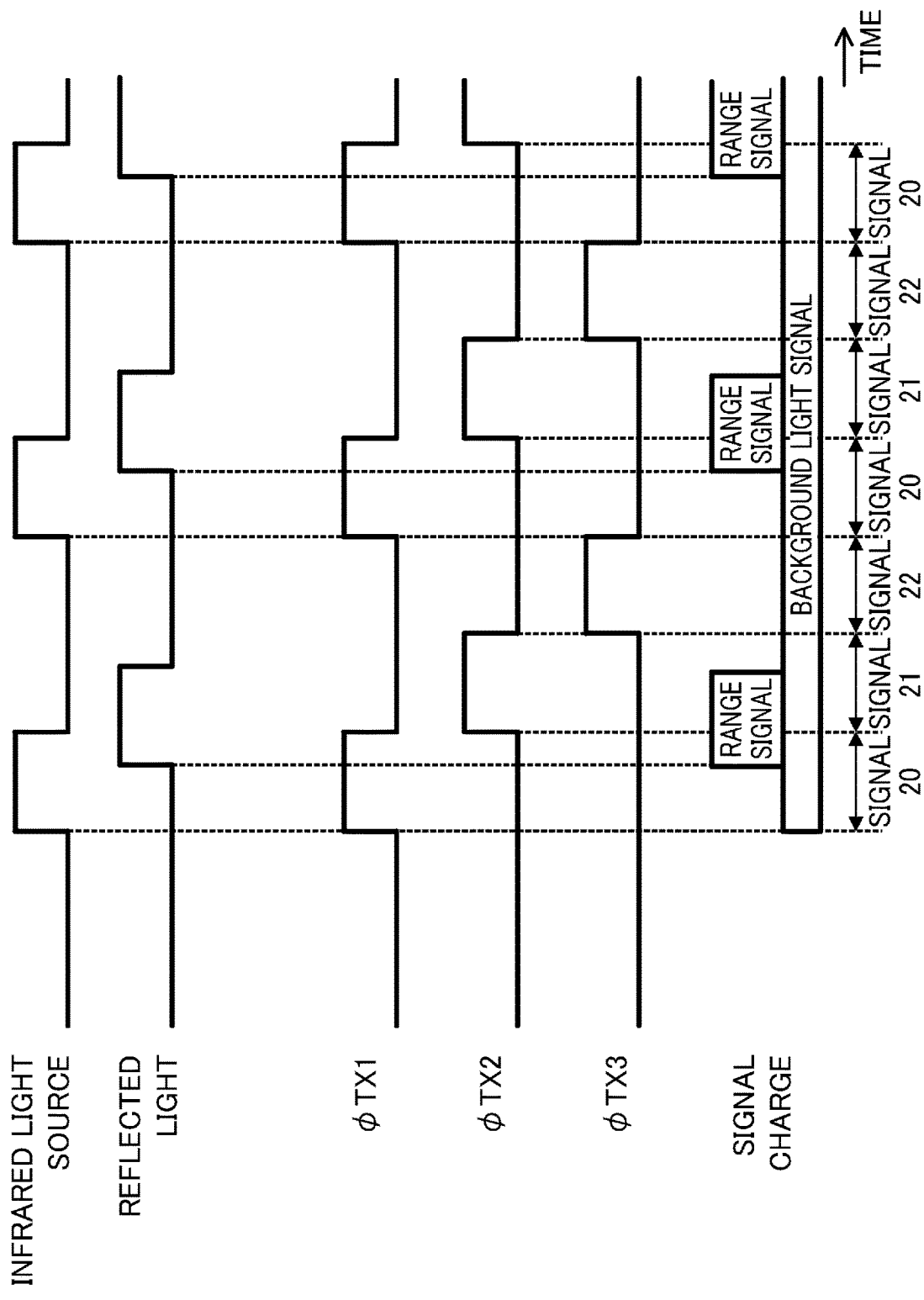
FIG. 28 is a timing chart showing detailed operation of the solid-state image-capturing device of FIG. 25 during a range/background light signal accumulation period.

FIG. 27 is a timing chart schematically showing operation of the solid-state image-capturing device of FIG. 25, particularly illustrating an example in which a signal for producing a visible light image and a signal for producing a range image from which an influence of background light has been removed are obtained during the same single frame scanning period. FIG. 28 is a timing chart showing detailed operation of the solid-state image-capturing device of FIG. 25 during a range/background light signal accumulation period Td.

Firstly, the fourth embodiment is different from the first embodiment in that, during the range/background light signal accumulation period Td, as shown in FIG. 28, a range signal 20, a range signal 21, and a background light signal 22 are successively read out to the floating regions 34a, 34b, and 34c by applying control signal pulses ϕTX1, ϕTX2, and ϕTX3.

After the end of the range/background light signal accumulation period Td, a control signal pulse ϕTX4 is applied, so that a visible light signal 23 is read out to the floating region 34d. Thereafter, by controlling the vertical scan circuit 30 and the horizontal scan circuit 31, the range signal 20, the range signal 21, the background light signal 22, and the visible light signal 23 are output.

For production of a range image, as in the solid-state image-capturing device of the first embodiment, background light components contained in the range signal 20 and the range signal 21 are removed using the background light signal 22.

For production of a visible light image, as in the solid-state image-capturing device of the first embodiment, an infrared component contained in the visible light signal 23 is removed using the range signal 20, the range signal 21, and the background light signal 22.

Thus, according to the TOF ranging system of the fourth embodiment, even when a CMOS image sensor is used as the solid-state image-capturing device, a signal for producing a visible light image and a signal for producing a range image from which an influence of background light has been removed can be obtained during the same single frame scanning period. As a result, the signal transfer period Tc can be reduced, and therefore, the frame rate can be further improved. Also, the range signal 20, the range signal 21, and the background light signal 22 are successively repeatedly accumulated, and therefore, the accuracy of range information of a moving object can be further improved.

Fifth Embodiment

Figure 29:
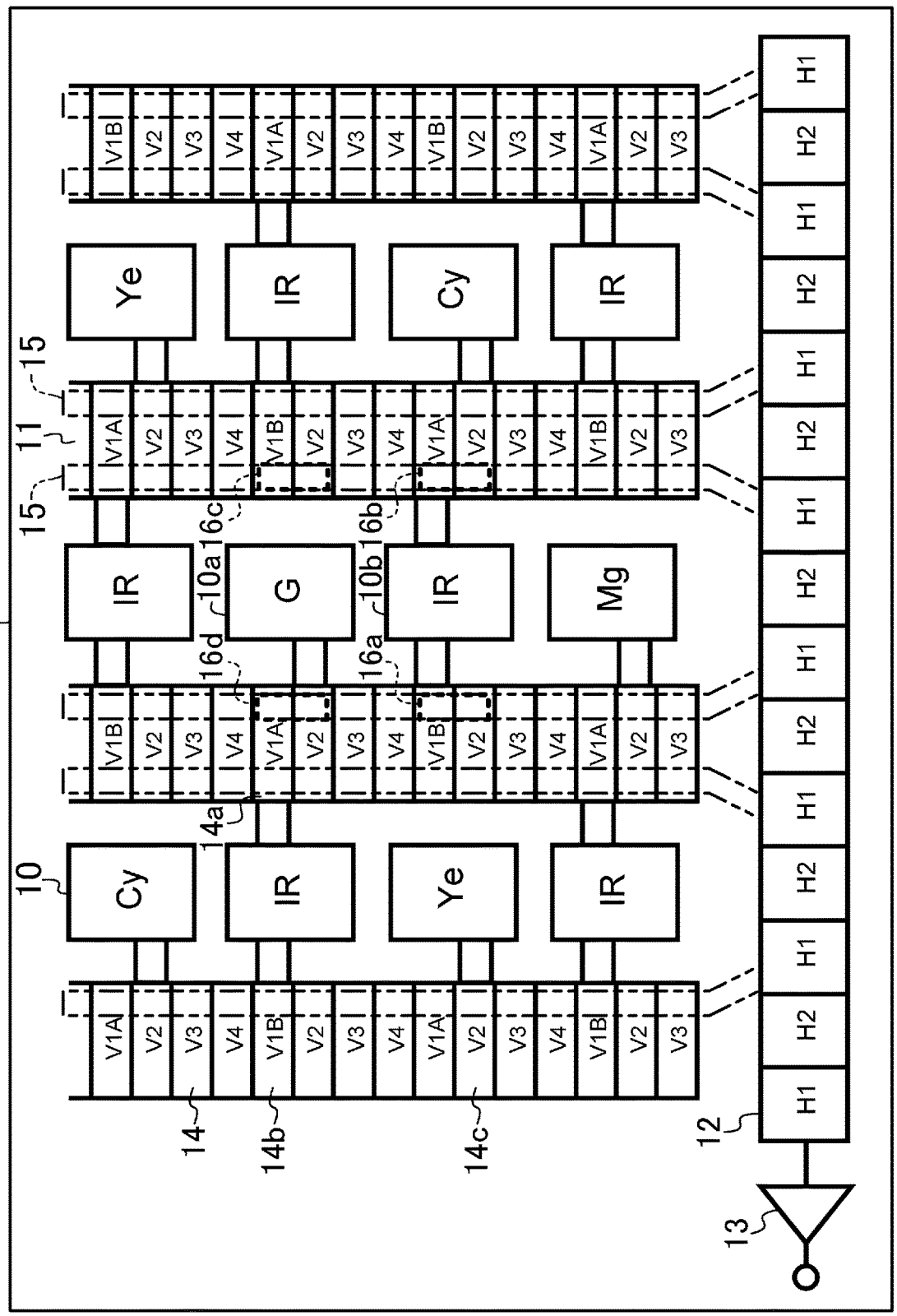
FIG. 29 is a plan view showing a fifth embodiment of the solid-state image-capturing device in FIG. 1.

FIG. 29 is a plan view showing a fifth embodiment of the solid-state image-capturing device 105 in FIG. 1. Here, it is assumed that the ranging system of FIG. 1 is of TOF, and the solid-state image-capturing device 105 is a CCD image sensor.

The solid-state image-capturing device of the fifth embodiment is different from the solid-state image-capturing device of the first embodiment in that each of the visible light photoelectric conversion units 10a includes a filter that selectively transmits green (G), magenta (Mg), yellow (Ye), or cyan (Cy) light. Specifically, the filter arrangement of the photoelectric conversion units 10 is the only difference, and the other parts, such as electrodes, etc., have the same configuration. A method for driving the solid-state image-capturing device is similar to the method for driving the solid-state image-capturing device of the first embodiment shown in FIGS. 3-8. However, the solid-state image-capturing device of the fifth embodiment is the same as the solid-state image-capturing device of the first embodiment in that they are intended to provide a structure and drive method that can obtain, during the same single frame scanning period, a signal for producing a visible light image and a signal for producing a range image from which an influence of background light has been removed.

According to the TOF ranging system of the fifth embodiment, even when each of the photoelectric conversion units 10a includes a filter that selectively transmits green (G), magenta (Mg), yellow (Ye), or cyan (Cy) light, a signal for producing a visible light image and a signal for producing a range image from which an influence of background light has been removed can be obtained during the same single frame scanning period. As a result, the sensitivity and resolution of a visible light image can be improved.

Sixth Embodiment

Figure 30:
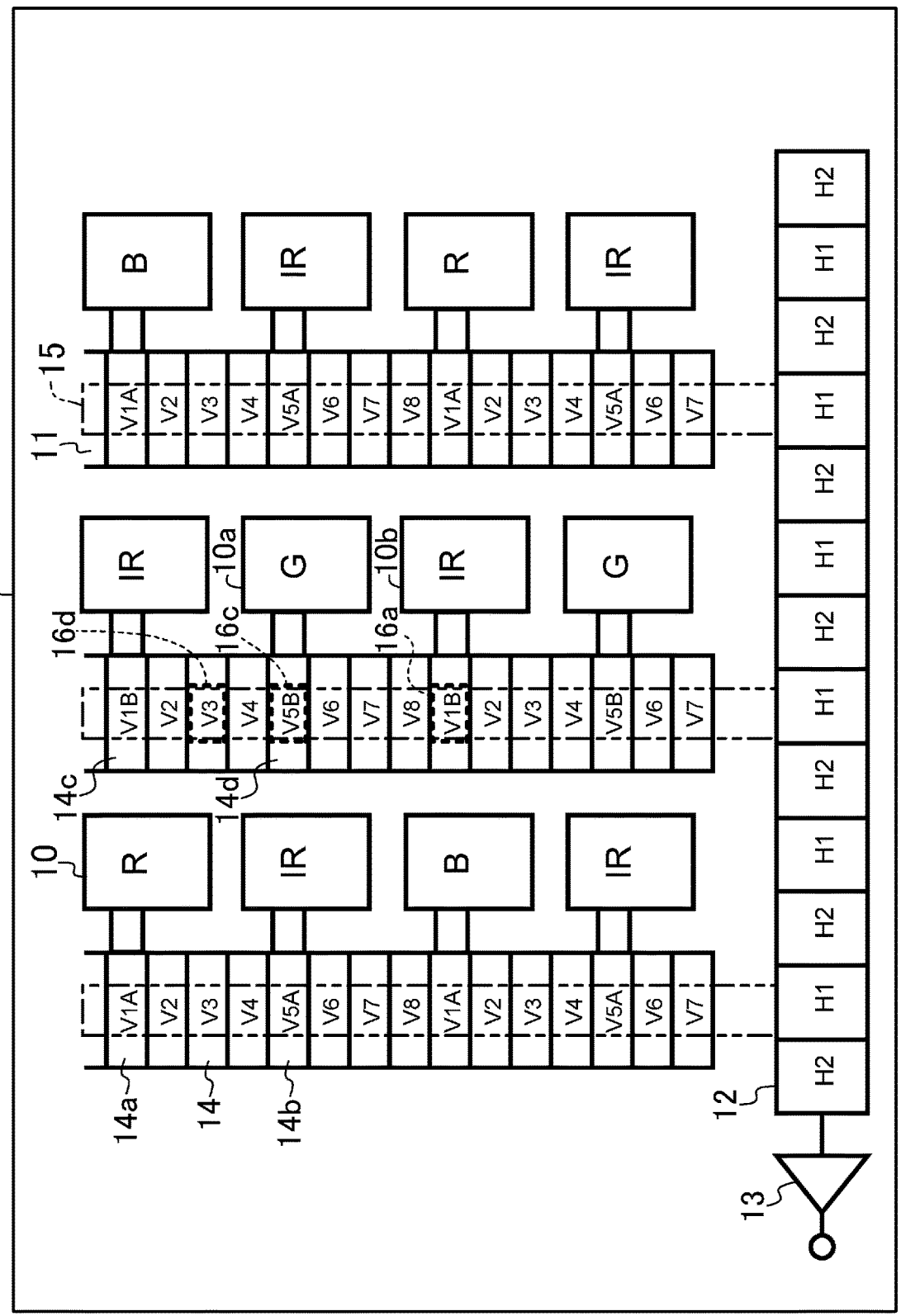
FIG. 30 is a plan view showing a sixth embodiment of the solid-state image-capturing device in FIG. 1.

FIG. 30 is a plan view showing a sixth embodiment of the solid-state image-capturing device 105 in FIG. 1. Here, it is assumed that the ranging system of FIG. 1 is of structured light, and the solid-state image-capturing device 105 is a CCD image sensor. The structured-light ranging system of the sixth embodiment is different from that of the first embodiment in that illumination is performed using predetermined patterns of infrared light.

The solid-state image-capturing device of the sixth embodiment is different from the solid-state image-capturing device of the first embodiment in the method for reading and accumulating signal charge from the photoelectric conversion units 10, and therefore, the configuration of the vertical transfer unit 11. However, the solid-state image-capturing device of the sixth embodiment is the same as the solid-state image-capturing device of the first embodiment in that they are intended to provide a structure and drive method that can obtain, during the same single frame scanning period, a signal for producing a visible light image and a signal for producing a range image from which an influence of background light has been removed. The differences between the first and sixth embodiments will now be mainly described, and the same points will not be described.

The vertical transfer unit 11 in the solid-state image-capturing device of FIG. 30 performs eight-phase drive, where there are eight vertical transfer electrodes (gates) 14 per two pixels. The vertical transfer unit 11 includes a first read electrode 14a and a fourth read electrode 14d that correspond to each visible light photoelectric conversion unit 10a, and a second read electrode 14b and a third read electrode 14c that correspond to each infrared light photoelectric conversion unit 10b. Each vertical transfer unit 11 includes one vertical transfer path 15 and signal packets 16a, 16c, and 16d.

Figure 31:
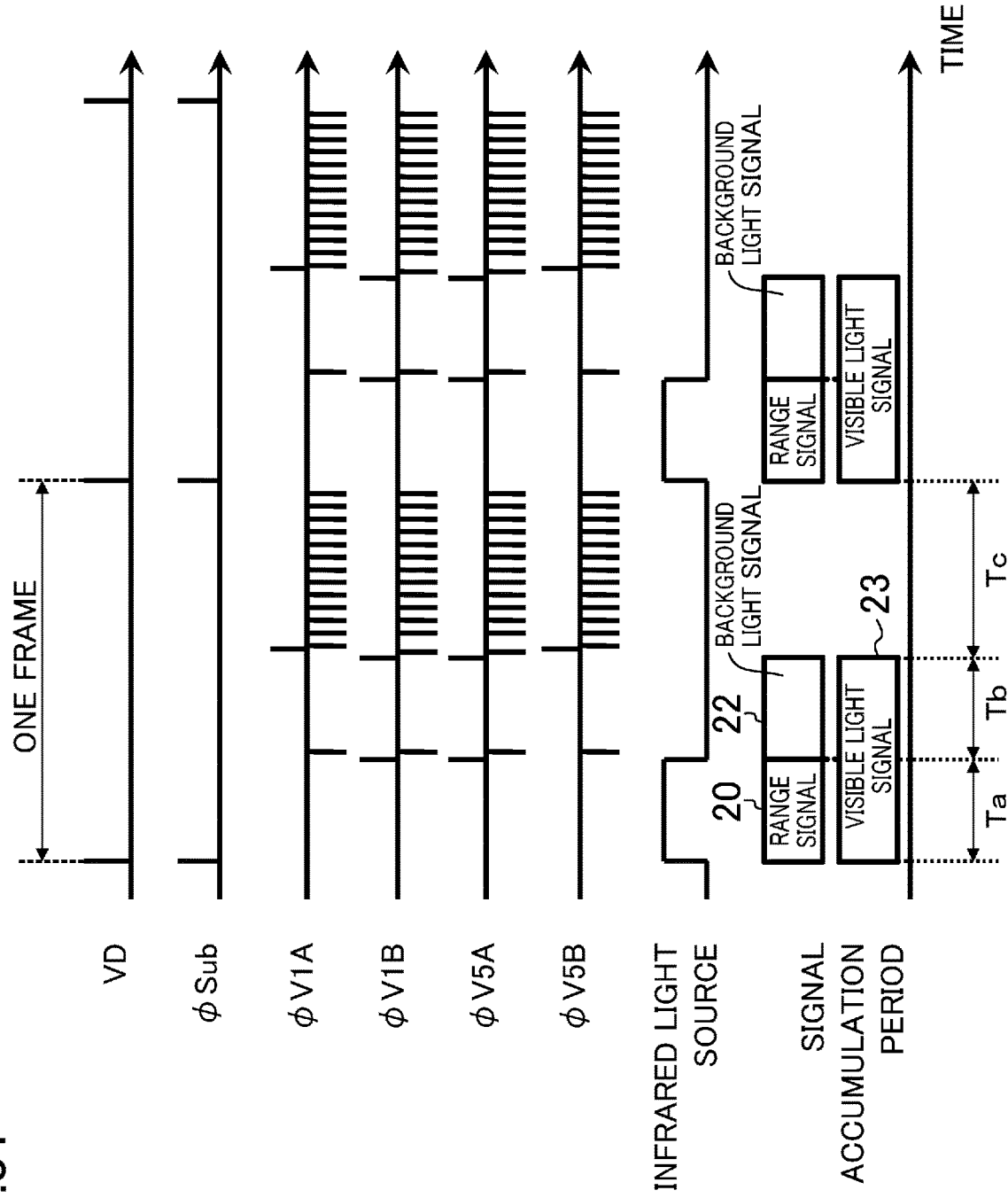
FIG. 31 is a timing chart schematically showing operation of the solid-state image-capturing device of FIG. 30.
Figure 32:
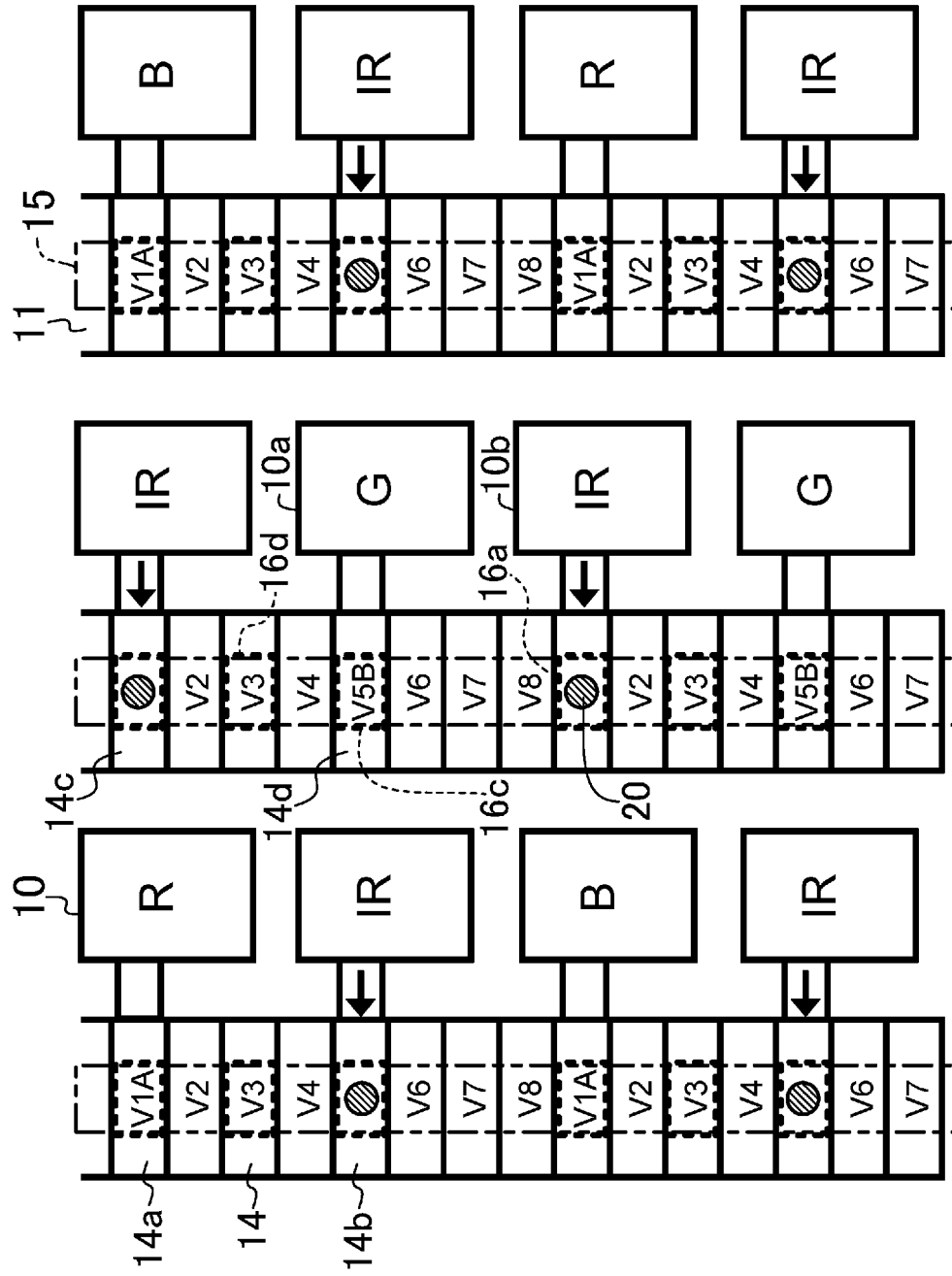
FIG. 32 is a plan view showing operation of the solid-state image-capturing device of FIG. 30 at a certain timing.
Figure 33:
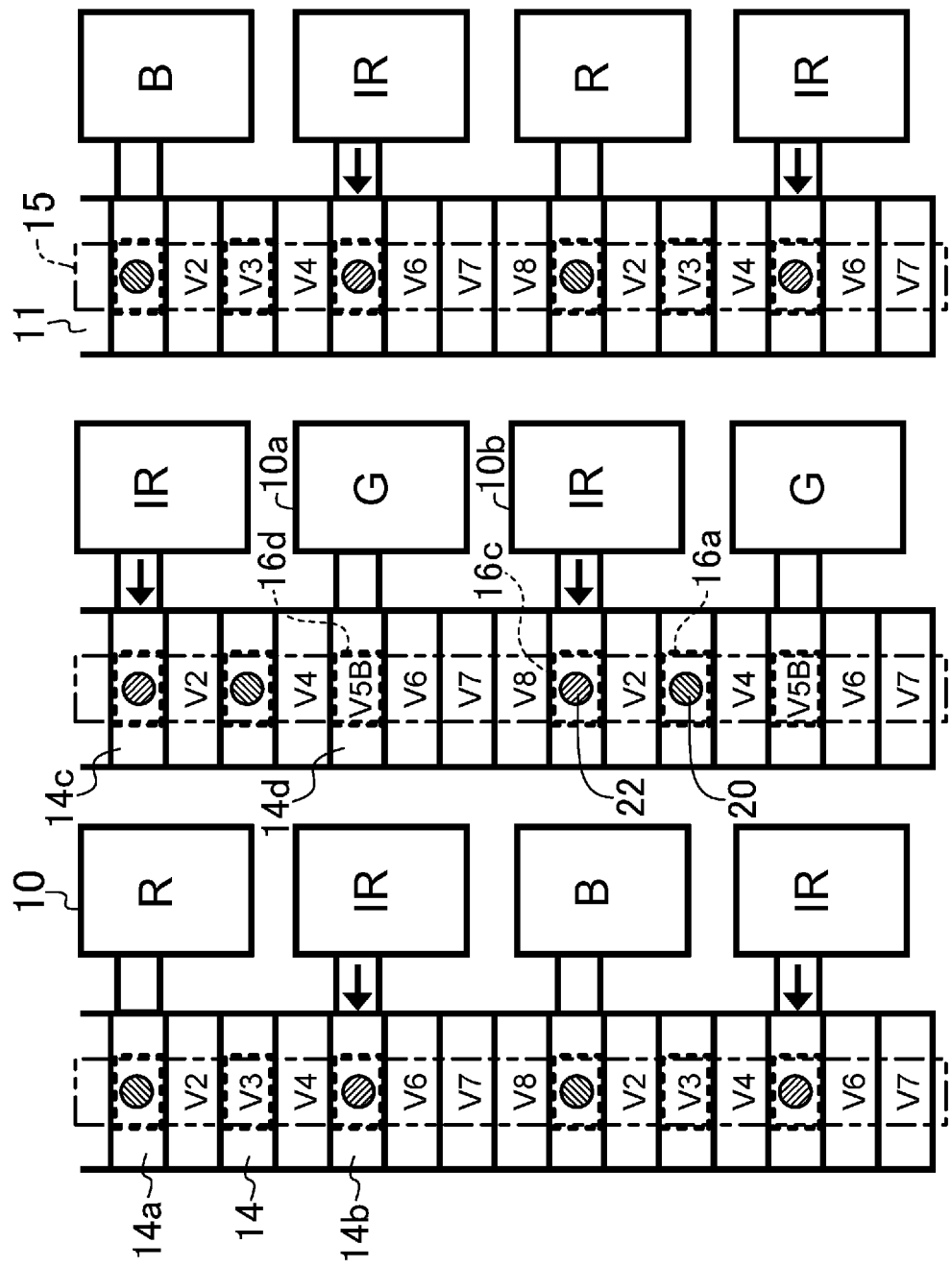
FIG. 33 is a plan view showing operation of the solid-state image-capturing device of FIG. 30 at a timing following the timing of FIG. 32.
Figure 34:
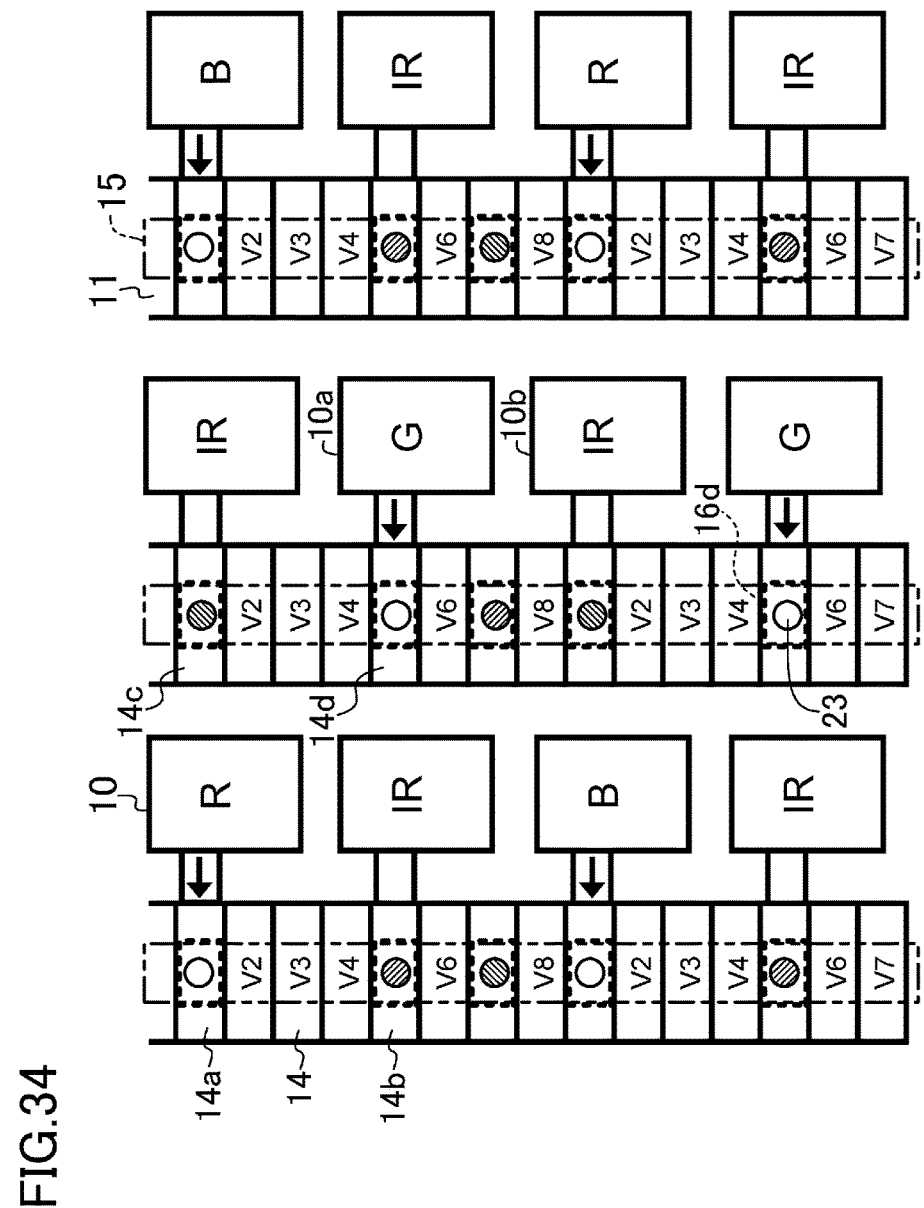
FIG. 34 is a plan view showing operation of the solid-state image-capturing device of FIG. 30 at a timing following the timing of FIG. 33.

FIG. 31 is a timing chart schematically showing operation of the solid-state image-capturing device of FIG. 30, particularly illustrating an example in which a signal for producing a visible light image and a signal for producing a range image from which an influence of background light has been removed are obtained during the same single frame scanning period. FIGS. 32, 33, and 34 are plan views showing operation of the solid-state image-capturing device of FIG. 30 at individual timings.

Initially, during a range signal accumulation period Ta, read pulses φV1B and φV5A are applied, so that, as shown in FIG. 32, a range signal 20 accumulated during a period of time when the infrared light source 103 emits light is read out and then accumulated in the signal packet 16a.

After the end of the range signal accumulation period Ta, the infrared light illumination is stopped, and as shown in FIG. 33, the range signal 20 are transferred along with the signal packets 16a, 16c, and 16d in the forward direction. During a background light signal accumulation period Tb, background light is emitted during a period of time having the same length as that of the range signal accumulation period Ta, and thereafter, the read pulses φV1B and φV5A are applied, so that a background light signal 22 is read out and then accumulated in the signal packet 16c.

After the end of the background light signal accumulation period Tb, as shown in FIG. 34, the range signal 20 and the background light signal 22 are transferred along with the signal packets 16a, 16c, and 16d in the forward direction. After the transfer, read pulses φV1A and φV5B are applied, so that a visible light signal 23 is read out and then accumulated in the signal packet 16d.

During a signal transfer period Tc, the vertical transfer unit 11 and the horizontal transfer unit 12 are successively scanned to output the range signal 20, the background light signal 22, and the visible light signal 23.

For production of a range image, as in the TOF ranging system of the first embodiment, initially, a background light component contained in the range signal 20 is removed using the background light signal 22. Here, the infrared light source 103 emits predetermined patterns of light, and therefore, an accurate range image can be produced by calculating a positional mismatch amount between each light pattern from the range signal 20 from which a background light component has been removed.

For production of a visible light image, the structured-light ranging system of the sixth embodiment is different from that of the first embodiment only in that the range signal 21 is not used. Therefore, an infrared component contained in the visible light signal 23 is removed using the range signal 20 and the background light signal 22.

Thus, according to the structured-light ranging system of the sixth embodiment, a signal for producing a visible light image and a signal for producing a range image from which an influence of background light has been removed can be obtained during the same single frame scanning period, and therefore, unlike the conventional art, it is not necessary to use a plurality of frames in order to obtain range information. As a result, the accuracy of range information of a moving object and the frame rate can be improved.

Seventh Embodiment

A stereo ranging system according to a seventh embodiment will now be described, mainly indicating differences from the sixth embodiment.

The stereo ranging system of the seventh embodiment has a schematic configuration shown in FIG. 1, except that, unlike the structured-light ranging system of the sixth embodiment, two solid-state image-capturing devices 105 and two infrared light sources 103 are provided, and an object 101 is uniformly illuminated with infrared light.

The solid-state image-capturing device of the seventh embodiment has a configuration and drive method similar to those of the solid-state image-capturing device of the sixth embodiment shown in FIGS. 30-34.

For production of a range image, as in the structured-light ranging system of the sixth embodiment, initially, a background light component contained in the range signal 20 is removed using the background light signal 22. Here, a total of two infrared light sources 103 are provided on opposite sides of the solid-state image-capturing device 105. By calculating a distance to an object 101 by triangulation using the range signal 20 from which a background light component has been removed using the infrared light output from the two infrared light sources 103, an accurate range image can be produced.

For production of a visible light image, as in the structured-light ranging system of the sixth embodiment, an infrared component contained in the visible light signal 23 is removed using the range signal 20 and the background light signal 22.

According to the stereo ranging system of the seventh embodiment, a signal for producing a visible light image and a signal for producing a range image from which an influence of background light has been removed can be obtained during the same single frame scanning period, and therefore, unlike the conventional art, it is not necessary to use a plurality of frames in order to obtain range information. As a result, the accuracy of range information of a moving object and the frame rate can be improved.

Although the embodiments of the present disclosure have been described above, the present disclosure is not limited to these embodiments. It will be understood by those skilled in the art that various changes or modifications can be made to the embodiments without departing the scope of the present disclosure. Parts of the embodiments may be combined to obtain other new embodiments, which are also within the scope of the present disclosure.

For example, in the first to seventh embodiments, the single two-phase drive horizontal transfer unit 12 is provided. However, similar advantages can be obtained even when a three- (or more) phase drive horizontal transfer unit is provided or a plurality of horizontal transfer units are provided.

As described above, the image-capturing device of the present disclosure can improve the ranging accuracy of a moving object and the frame rate, and therefore, is useful as an image-capturing device that obtains a range image of an object located at a certain distance along with a visible light image of the object.

What is claimed is:

1. An image-capturing device comprising:
an infrared light source configured to emit infrared light;
a solid-state image-capturing device including a plurality of pixels configured to convert light into signal charge, the plurality of pixels being arranged on a semiconductor substrate in a matrix; and
a signal processor configured to process an output signal from the solid-state image-capturing device, wherein
the image-capturing device functions as a TOF ranging sensor configured to illuminate a space including an object with the infrared light emitted in a pulsed form,
the solid-state image-capturing device outputs as the output signal, a plurality of signals including a background light signal and range signals, the background light signal being an infrared light signal during a period of time when the infrared light is not emitted, and the range signals being infrared light signals during different periods of time when the infrared light is emitted, and
the signal processor is configured to
subtract the background light signal from the range signals,
calculate a distance to the object based on a ratio of the range signals after subtracting the background light signal, and
produce an image other than a range image by subtracting the background light signal from one of the plurality of signals.

2. The image-capturing device of claim 1,
the solid-state image-capturing device has frame scanning periods each of which includes a single signal accumulation period and a single signal transfer period subsequent to the single signal accumulation period, and
the solid-state image-capturing device accumulates, during the single signal accumulation period, first signals from all of the plurality of pixels during a period of time when the infrared light is emitted, and second signals from all of the plurality of pixels during a period of time when the infrared light is not emitted, and outputs all the accumulated first and second signals during the single signal transfer period.

3. The image-capturing device of claim 1, wherein
each of the plurality of pixels includes, in order to output a plurality of signals per pixel,
a plurality of switches configured to allow the signal charge obtained by photoelectric conversion to be transferred to a floating region,
a plurality of signal amplifiers configured to perform signal amplification based on a potential of the floating region, and
a plurality of selectors configured to selectively output signals obtained by the signal amplification by the signal amplifiers.

* * * * *